United States Patent [19]
Boggs et al.

[11] 3,827,287
[45] Aug. 6, 1974

[54] METHODS OF AND APPARATUS FOR MEASURING THE THICKNESS OF SUCCESSIVE SECTIONS OF A CABLE JACKET

[75] Inventors: Luther Miles Boggs; Howard John Flichman; James Alphus Hudson, Jr., all of Atlanta, Ga.

[73] Assignee: Western Electric Company, Incorporated, New York, N.Y.

[22] Filed: July 5, 1972

[21] Appl. No.: 268,961

[52] U.S. Cl. .............................. 73/67.8 S, 73/67.9
[51] Int. Cl. .................... G01b 17/02, G01n 29/00
[58] Field of Search .............. 73/67.8, 67.9, 67.8 R, 73/67.8 S; 328/109, 115; 324/186

[56] References Cited
UNITED STATES PATENTS

| | | | |
|---|---|---|---|
| 3,372,576 | 3/1968 | Dory | 73/67.9 |
| 3,423,992 | 1/1969 | Dory | 73/67.9 |
| 3,474,664 | 10/1969 | Mitchell et al. | 73/67.9 |
| 3,509,752 | 5/1970 | Moore | 73/67.9 |
| 3,605,504 | 9/1971 | Kummer et al. | 73/67.9 X |

*Primary Examiner*—Richard C. Queisser
*Assistant Examiner*—Stephen A. Kreitman
*Attorney, Agent, or Firm*—E. W. Somers

[57] ABSTRACT

In an ultrasonic cable jacket measuring system including a pulsed crystal transducer, successive associated pairs of echo pulses associated with surfaces of the cable defining jacket thickness are received. Data proportional to jacket thickness in the event that a sequence of associated first and second pulses are valid as determined by values expected in a specific environment and arrangement and of particular materials, the thickness of which is being measured.

A valid first echo pulse has a predetermined threshold amplitude which is not exceeded after a preset time value as tested by a first echo pulse verification circuit. A valid second echo pulse has at least a predetermined peak amplitude and at least a predetermined duration characteristic as determined by a second echo pulse verification circuit. A first echo pulse having threshold amplitude causes operation of a logic circuit for initiating a time count which is concluded upon a validating of the first echo pulse and upon receipt of a second echo pulse having threshold amplitude. The validation of the first and second pulses enables a control pulse generator which is operated at the end of a time interval in which the logic circuit expects the receipt of echo pulses to provide for the further processing of the time count. A sequencer pulses sequentially each of a plurality of channels associated with a plurality of crystals arrayed about the cable being advanced through a cooling trough to begin a test cycle and conditions the system for another cycle of operation.

30 Claims, 4 Drawing Figures

METHODS OF AND APPARATUS FOR MEASURING THE THICKNESS OF SUCCESSIVE SECTIONS OF A CABLE JACKET

BACKGROUND OF THE INVENTION

1. Field of the Invention

This invention relates to methods of and apparatus for measuring ultrasonically automatically the thickness of successive sections of an elongated material, and, more particularly, to logic methods of and logic circuitry for measuring ultrasonically the thickness and eccentricity of a jacket extruded about successive sections of a cable being advanced along a predetermined path.

2. Prior Art and Technical Considerations

In one example of a cable constructed for use in the communications industry, a metallic moisture barrier is wrapped longitudinally about a cable core being advanced along a predetermined path with the overlapping edges of the moisture barrier bonded together to form a watertight seam. Thereafter, a jacket of a plastic material is extruded over the core and moisture barrier with the jacket in some cable codes being bonded to the outwardly facing surface of the moisture barrier. Then the jacketed cable is passed through a relatively long water trough to reduce the temperature of the jacket.

It is desirable to monitor continuously the jacket wall thickness as well as the eccentricity of the jacket. Monitoring of the jacket facilitates the maintenance of a uniform thickness of the jacket and the conservation of the consumption of the plastic material by applying the minimum acceptable jacket thickness. The monitoring of the eccentricity is of assistance in making adjustments to the extrusion apparatus to prevent the final product from being "out-of-round."

In one prior art method of monitoring the thickness of a plastic jacket extruded over a metallic moisture barrier, the capacitance is measured between the metallic barrier and an electrode placed in direct contact with the plastic jacket. The measured capacitance is a function of the dielectric constant of the plastic material and the distance between the electrode and the metallic barrier, that distance being the jacket thickness.

This prior art method is satisfactory when the dielectric constant of the plastic is independent of temperature or when a plastic, the dielectric constant of which is not independent of temperature, is maintained accurately at a predetermined temperature. However, when measuring the capacitance of a plastic, the dielectric constant of which is not independent of temperature, an inaccurate measurement will probably be obtained because the temperature of the plastic varies due to the heat resulting from bonding the metallic barrier and the heat from the extrusion of the plastic onto the sheath.

Another problem manifests itself when attempting to measure dynamically the thickness and eccentricity of an inner jacket. Since there is no metallic moisture barrier surrounding the inner jacket at that point, conventional techniques may not be used. In those situations, end samples were taken off the final product with an attempt then made to adjust the extruder where necessary. Clearly, there is a need for a jacket thickness and eccentricity measurement apparatus which could be used on any structural arrangement of cable construction.

Also, it is desirable to monitor the jacket thickness as soon as possible after the plastic has been extruded onto the cable core. In this way, information may be communicated to a control system to control continuously effectively the extrusion apparatus. In many of the prior art methods of monitoring cable jacket thickness in the manufacture of telephone cable, the monitoring is accomplished after the cable is passed out of water cooling trough. This is necessary since the prior art methods have usually involved contacting type measurement devices which of necessity should not be engaged with the cable jacket until the temperature of the cable jacket has been reduced.

For example, successive sections of a cable jacket were monitored by a single probe mounted for movement spirally about the advancing cable. By the time such a system monitored and recorded the thickness of opposite wall sections of the cable, the cable had been advanced through an appreciable distance. Hence, the thickness of the wall sections compared were at points spaced longitudinally along the cable. Such measurements are not truly representative of cable concentricity, that is to say, values of diametric wall sections essentially in the same cross-sectional plane of the cable. There have been advances since the advent of this system.

One currently used system for monitoring diametrically opposed conductor cable sections to measure sheath thickness and eccentricity is disclosed in U.S. Pat. No. 3,500,185 issued on Mar. 10, 1970 in the name of W.T. Eppler. A pair of probes are mounted on an indexable head and spaced to engage diametrically opposite wall sections of an advancing cable. The probes are switched alternately into and out of one arm of a capacitance test set bridge for measuring cable jacket thickness. Another bridge arm includes a reference-standard capacitor representative of a preset desired jacket wall thickness with which the monitored value of capacitance is compared.

The system is arranged to index the head and probes into four sensing positions about the cable axis. A pair of graphs corresponding to the alternate measurements are made and represent measurements of diametrically opposed jacket wall thicknesses. Should the thickness of the extruded plastic jacket vary, the rate of variation is low. Consequently, longitudinally adjacent measurements of diametrically opposed jacket wall sections are essentially as effective and reliable as diametric measurements in the same plane of the cable.

It should also be observed that even this relatively new monitoring system is not used to monitor the inner jacket of certain types of cable construction since capacitance measurement is dependent on having a metallic shield. Clearly, there is a need for an automatic non-contacting measurement apparatus which may be used in the vicinity of the extruder to measure the thickness of inner and outer jackets. Other advantages accrue to a non-contacting device. Excessive wear is experienced with a contacting probe which causes poor readings. This necessitates high maintenance costs.

Also, the apparatus for monitoring continuously automatically jacket thickness should have the capability of controlling the extruder to avoid unequal jacket thickness at diametrically opposed wall sections of the jacket. This, of course, will avoid unequal distribution of stresses during the bending of the cable.

Since the cable is advanced almost immediately into a cooling bath, the test device must not be adversely affected by the water, or in the alternative, must not be required to be immersed in the water.

Several systems were considered as meeting these requirements. Of these, an ultrasonic system was deemed to be the most advantageous. In an ultrasonic system, (1) the measurement can be made without having a sensor engage the jacket, (2) the water environment of the cooling trough is of help in performing the measurement in that ultrasonics requires a couplant that is readily available, and (3) operating frequencies and time measurements between two returning signals will be of an order of magnitude which is reasonable in a manufacturing facility.

A pulse echo ultrasonic technique for measuring thickness in solids in which a pulse is transmitted and the system awaits an echo to return has been used in the prior art. This is similar to a sonar system in which distances are measured by determining the time interval between a generated pulse and the echo thereof. The sound wave pulse is generated by a crystal transducer which is also used to pick up the return pulses. The return pulses are processed in a receiver, and the time difference between the return echo from the outer surface and the return echo from the inner surface is a measure of the jacket thickness.

The application of the pulse echo technique to measuring thickness and eccentricity seems to be ideal. An ultrasonic apparatus includes a crystal, and more commonly used ones being lead zirconate ceramic, niobate, quartz, lithium sulphate and barium titanate. Metal is deposited on either side of a cut crystal to provide an electrically conductive surface.

The crystal which is aligned with the path of the cable is stimulated or shock-excited electrically by using a high voltage potential to create a mechanical ringing of the crystal. The mechanical motion is transmitted in the form of a pressure or sound wave through the couplant, e.g., water of the cooling trough in this application, to the cable being measured.

Depending upon the acoustical mismatch between the couplant and the article, e.g., cable, under test, a portion of the sound wave energy will be reflected and a portion will continue on through the media of the article under test. At each interface of the article, a similar transformation occurs.

Generally, in the past, in the ultrasonic measurement of elongated material such as tubing, a crystal having a line focus has been positioned with a line focus parallel with the longitudinal axis of the elongated material. However, in the tube-making art, the rigidity of the tube precludes any significant motion laterally of the successive sections of the tube. This is unlike the lateral motion experienced in the cable-making art as the successive sections are moved through the cooling trough.

More particularly, an ultrasonic crystal that has a resonant frequency in the mega hertz region is pulsed and a ringing signal is transmitted through the water of the cooling trough to the cable jacket where part of the signal is reflected off the outer surface and returns to the crystal which also operates as a detector. A second reflection, or echo, occurs off the inner surface of the jacket and reaches the crystal subsequent to that from the outer surfaces reflection by a time difference that relates directly to the thickness of the cable jacket. The echo signals are processed to produce a measure of the thickness of the jacket.

In one commercially available ultrasonic measuring apparatus, facilities are provided for an approximate 100 volt excitation of crystal with provisions for detecting so-called threshold amplitudes having one polarity. The term "threshold" is intended to be interpreted as a minimum amplitude detection for purposes of measuring a time interval. There are no provisions for verifying the validity of the echo pulses received. Moreover, therein, the apparatus is front panel controlled manually by an experienced operator who, with the assistance of an oscilloscope, looks for a sequence of echoes with variable time delay therebetween. Of course, this is not the type of apparatus conducive to use in a high speed modern cable manufacturing environment.

In U.S. Pat. No. 3,423,992, an ultrasonic apparatus is used to measure thickness by utilizing the pulse echo technique. Facilities are provided for producing measuring signals of an amplitude proportional to the time interval which separates two successive echoes. Facilities are also provided for eliminating the display of the measuring signals in the time intervals of duration of surface irregularities or disturbances in the propagation.

An amplifier selects bottom echoes from an immersed tube and applies a corresponding wave form to a trigger circuit. Square waves produced by the trigger circuit operate a recorder to which is also applied a saw-tooth voltage applied by a device controlled by the receiver. To prevent the generation of saw-tooth forms despite the disappearance of a bottom echo due to surface defects, the saw-tooth voltage is applied to the recorder only in the presence of square waves.

Facilities are provided and connected to the measuring facilities such that when the trigger circuit is switched on, the measuring facilities are operated, and when switched out, the measuring facilities are inhibited. The trigger circuit is controlled merely by an echo pulse reflected from the second reflecting surface. Preferably, the trigger circuit is controlled by a logic system which tests the characteristics of echo pulses and not by the mere presence of an echo pulse.

The operation of the latter apparatus is apparently based on the assumption that if a first bottom echo is received, a second bottom echo will follow. While this may suffice for measuring tubing, sophistication is desired when testing a cable advanced with accompanying lateral motion. Moreover, the latter mentioned patent discloses apparatus for generating a signal having an amplitude proportional to the time interval which separates two successive echo pulses reflected from the second reflecting surface. Desirably, for measuring cable jacket thickness, a system should generate a signal having an amplitude proportional to the time interval which separates echo pulses from the two surfaces which define the jacket thickness.

In another commercially available ultrasonic apparatus (see U.S. Pat. No. 3,509,752), a transducer is excited by a device triggered by a clock pulse. Reflected front and back surface echo pulses from an article are coupled to a receiver which converts the received energy bursts into spaced rectangular pulses which are coupled to a gauge unit. The gauge unit is gated by a clock pulse which is suitably delayed and allows only the front and back surface pulses to pass. A DC voltage proportional to the spacing between the front and back surface pulses, and hence, the thickness, is generated as the apparatus output. In this apparatus, the transducer is coupled acoustically to an accessible surface of the article under test and a filter is provided for forming cycle pulses of a signal received from a comparator circuit into a single pulse.

Known ultrasonic pulse echo techniques are satisfactory when the thickness of the workpiece is large enough that proper resolution of the echo pulses can be realized. However, for very thin materials or workpieces, the time interval between returning echo pulses from the top and bottom surfaces becomes so small that the pulse widths of the echoes overlap and cause considerable difficulty in resolving the pulses.

At least one prior art patent (U.S. Pat. No. 3,474,664) discloses provisions for providing an analog output indicative of the thickness of a workpiece even though the time interval between successive echo pulses from the top and bottom surfaces of the material may be too short to enable any recognizable signal to be generated during such time interval. Measuring facilities, connected to a pulse transmitter and receiver, develop an on signal and an off signal being directly proportional to and at least twice as long as the elapsed time between the transmission of a pulse into the top surface of the workpiece and the receipt of a corresponding echo pulse at the top surface after reflection from the bottom surface. A tuned circuit is used to improve accuracy and to discriminate against interference signals.

This, of course, is of help in measuring thin workpieces. By providing a time duration in this manner, a reliable output signal is produced which reflects the thickness since any variations in the thickness will be inherent in each of the time intervals making up the duration and hence measured in the measuring time duration.

However, the prior art does not include facilities tailored to the particular needs of monitoring the thickness and eccentricity of successive sections of a cable jacket immediately following extrusion and capable of measuring only those signals which are meaningful.

One apparatus for measuring automatically ultrasonically is disclosed and claimed in a copending application, Ser. No. 268,973, filed of even date herewith in the names of L.M. Boggs- H.J. Flichman-J.A. Hudson, Jr. - J.W. Levengood. There is a need for logic circuitry and methods of carrying out the principles of the methods and apparatus of that invention.

SUMMARY OF THE INVENTION

It is an object of this invention to provide methods of and apparatus for measuring ultrasonically successive sections of an elongated material.

It is also an object of this invention to provide methods of and logic circuitry for measuring ultrasonically the thickness and eccentricity of successive sections of an inner cable jacket or an outer cable jacket without contacting the surface of the jacket.

Further, it is an object of this invention to provide methods of and logic circuitry for measuring ultrasonically jacket thickness and eccentricity and being capable of discriminating among signals relevant to a desired parameter determination and those signals which should be ignored.

It is yet another object of this invention to provide methods of and apparatus for automatically examining successive echo pulses in an ultrasonic testing of a cable jacket with respect to time duration and threshold amplitudes of the echoes together with the determination of the existence of a spacing between the pulse echoes and for the generation of a control pulse providing predetermined conditions are met.

It is a still further object of this invention to provide methods of and apparatus including logic circuitry for determining the validity of echo pulses received from a cable jacket subjected to pressure waves emitted by an excited transducer.

It is an additional object of this invention to provide methods of and logic circuitry for the excitation of crystal transducers to emit pressure waves and the receiving of echo pulses from an article under test while preventing substantially incursion of spurious noise signals.

It is another object of this invention to provide logic circuitry in an ultrasonic cable jacket thickness measuring apparatus which has the capability of providing meaningful measurements of the thickness of a jacket of a cable being advanced, notwithstanding lateral motion of the moving cable and imperfections in the cable jacket.

With these and other objects in mind, methods and apparatus are provided for controlling the measuring automatically ultrasonically of successive sections of an elongated member in which an on signal and an off signal are developed in response to the receipt of first and second associated echo pulses of predetermined test characteristics from one surface and an opposite surface, respectively, of the member while relative motion is caused to occur between the elongated member and a source of ultrasonic pulses.

More particularly, methods and apparatus are provided for establishing a test period during which echo pulses reflected from an elongated member subjected to ultrasonic waves are tested, transmitting an ultrasonic pulse into the member and then receiving a first echo pulse reflected from the one surface of the member and then receiving an associated second echo pulse from an opposite surface of the member, while excluding or discriminating out of extraneous low level signals, testing the first echo pulse and then an associated second echo pulse for a qualifying test characteristic, initiating in response to receiving a qualifying first echo pulse the development of the on signal and the examination of a validating test characteristic of the first echo pulse, conditioning partially in response to the first echo pulse being validated facilities for enabling the generation of a control pulse, initiating in response to the validation of the first echo pulse and the receipt of a qualifying associated second echo pulse the examination of validating test characteristics of a qualifying associated second echo pulse, while causing the development of the off signal with the time duration between the on signal and the off signal being related to the elapsed time between the receipt of the first echo pulse and the receipt of the associated second echo pulse, measuring the elapsed time between the on signal and the off signal, completing the conditioning of the enabling facilities in response to validating the associated second echo pulse to generate the control pulse, and processing the measured elapsed time in response to the generation of the control pulse.

Other objects and features of the present invention will be more readily understood from the following detailed description of specific embodiments thereof when read in conjunction with the appended drawings, in which:

DETAILED DESCRIPTION

GENERAL OVERALL ARRANGEMENT

Figure 1:
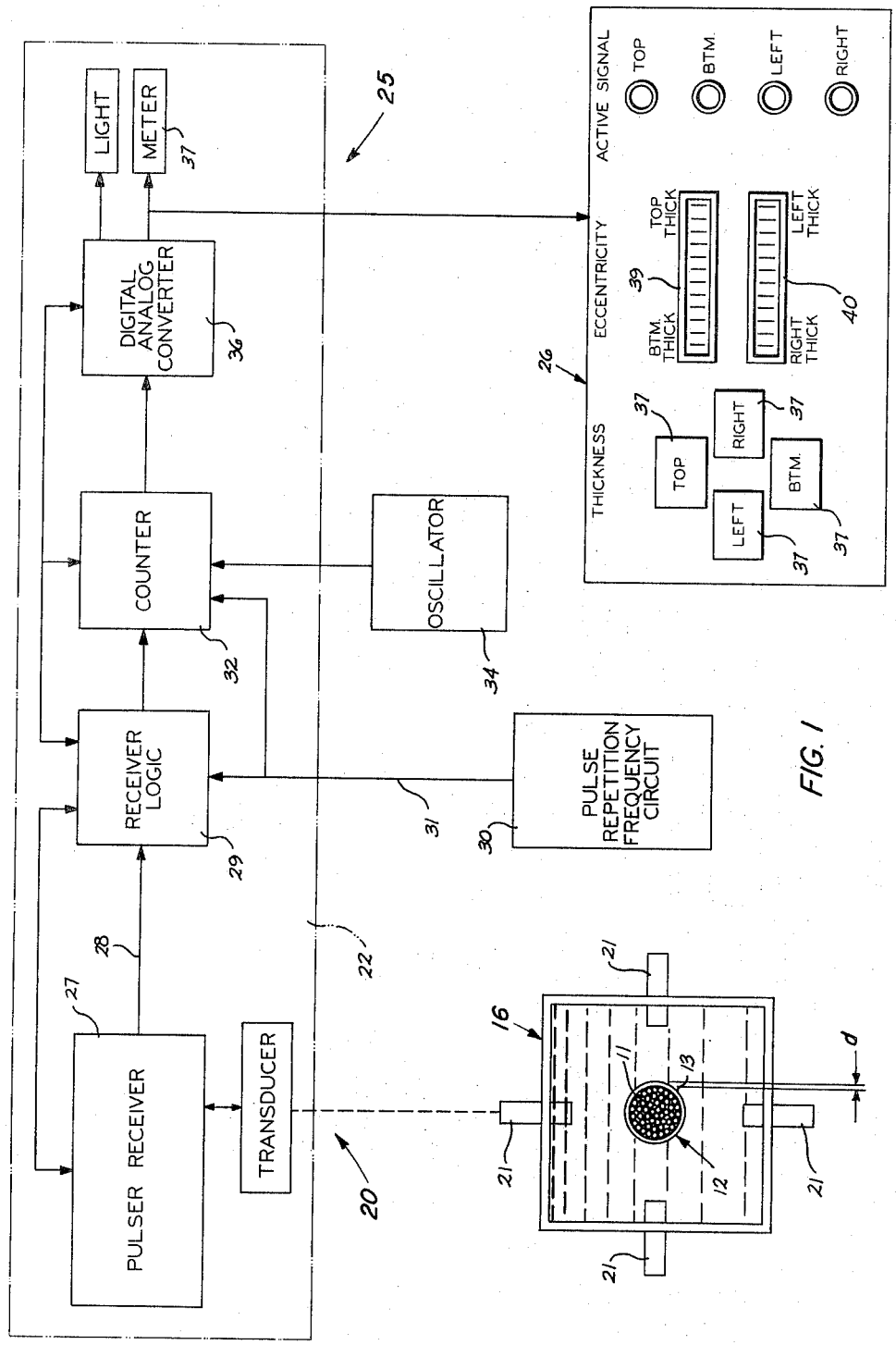
FIG. 1 is a view of an ultrasonic apparatus embodying the features of this invention for measuring the thickness and eccentricity of successive sections of a cable jacket and which includes four transducers in the form of crystals positioned in a water trough relative to the jacketed cable core being advanced through the trough and also showing a view partially in schematic showing a typical one of four channels used to perform the ultrasonic measurements including components which are common to all four channels.

Referring now to FIG. 1, successive sections of a cable core 11 are covered with a plastic material such as polyethylene to provide a cable 12 having a jacket 13. Successive sections of the cable 12 are advanced into and through a cooling trough 16.

In order to most effectively control the thickness "d" of the jacket 13 which is extruded over the core 11 and further to control the eccentricity of the jacket, an ultrasonic jacket measuring apparatus, designated generally by the numeral 20 (see FIG. 1) is used. The apparatus 20 monitors the jacket thickness and eccentricity immediately as the successive sections of the jacketed core 11 are advanced into the water trough 16. The apparatus 20 is non-contacting and measures the jacket thickness at a point along the manufacturing line that minimizes transport lag of feedback to an extruder control system.

The ultrasonic jacket thickness measuring apparatus 20 is designed to use the well-known pulse-echo measuring technique that requires at least one crystal 21 (see FIG. 1) which is excited to emit pulses directed toward the successive sections of the jacketed cable 12. The water of the cooling trough 16 serves as the coupling medium for transmitting ultrasonic energy to the cable jacket 13.

In order to conduct a meaningful monitoring of the thickness "d" of the jacket 13, it becomes necessary to measure the jacket thickness at several points around the periphery thereof. This is also necessary in order to be able to determine the eccentricity of the cable jacket 13.

As can best be seen in FIG. 1, a plurality of crystals 21—21 are deployed about and spaced from the circumference of the jacketed cable 12 with each of the crystals being immersed in the cooling medium, e.g., water, of the cooling trough 16.

The crystals 21—21 are excited by a voltage impulse which causes cyclical mechanical stresses. These stresses generate high frequency pressure gradients or waves in the coupling medium, which in this case is the water of the cooling trough 16. The waves, varying in intensity as a damped sinusoid, propagate to the surface of the cable jacket 13 (in time T, see FIG. 4a) where a portion thereof is reflected due to the acoustical impedance mismatch. This causes an outer surface echo (echo I, see FIG. 4a) to be generated.

A portion of the pressure wave also travels inwardly into the cable jacket 13 with a second reflection occurring at the inwardly facing surface of the cable jacket. This determines the second, or inner surface, echo (see echo II, FIG. 4a).

It will be recalled that the measurement technique involved is to determine the time separation ($2t$, see FIG. 4a) between echo signals. This separation relates directly to the thickness "d" of the cable jacket 13. The thickness data depends on the uniformity of the sound velocity in polyethylene. Experiments have shown that this velocity is substantially uniform, hence permitting the use of the equation $2d = vt$ where $d$ = polythickness, $v$ = sound velocity, and $t$ = echo separation time. The echo separation time is measured, and knowing $v$ (about 20 mils per microsecond), $d$ is readily determined. There may be some non-uniformity in the propagation velocity at the surface of the polyethylene which cools before the interior of the jacket 13.

Each of the crystals 21—21 is connected electrically to an associated one of a plurality of channels 22—22 (see FIG. 1). Each of the channels 22—22 include a plurality of elements to be described hereinafter for converting the time interval between the pulse echoes received from the various interfaces of the materials aligned with the associated crystal 21 to an output which is proportional to the thickness of the cable jacket 13.

Additionally, other elements are provided, which together with the four channels 22—22 comprise an electrical circuit, designated generally by the numeral 25. The output of the circuit 25 in terms of thickness and eccentricity is displayed for an operator on a console 26 (see FIG. 1).

Referring again to FIG. 1, there is shown a typical one of the channesl 22—22 together with other elements which are common to the four channels. Each of the channels 22—22 includes the associated one of the crystals 21—21 which is connected electrically to an associated pulser receiver, designated generally by the numeral 27. The pulser receiver 27 is a specially designed device which is used in each cycle initially to transmit a pulse to the associated one of the crystals 21—21 to cause the associated crystal to ring at the natural frequency thereof. Subsequently, in each one of the cycles, the pulser receiver 27 functions to receive pulse echoes from the cable 12 under test.

The pulser receiver 27 is connected electrically along a line 28 to a receiver logic circuit, designated generally by the numeral 29, which upon command from a pulse repetition frequency (PRF) circuit 30, causes the pulser receiver 27 to pulse the associated transducer crystal 21. As can be seen in FIG. 1, the pulse repetition frequency circuit 30 is connected along a line 31 to the receiver logic circuit 29. The receiver logic circuit 29 is designed to validate echo pulses received from the cable 12 under test and is capable of discarding those pulses not pertinent to the measurement of the thickness of the jacket 13. As such, the receiver logic circuit 29 must have the inherent intelligence to discriminate between noise spikes and valid signals as well as to differentiate as between the first and second echo signals.

The receiver logic circuit 29 is connected electrically to a counter, designated generally by the numeral 32, which includes a plurality of decade counters not shown. The counter 32 is designed to measure the width of the output pulse from the receiver logic circuit 29. The counter 32 is pulsed by a commercially available oscillator, designated generally by the numeral 34, (see oscillator output, FIG. 4(i)) and is designed to store the pulse count in a buffer or memory bank (not shown) provided that the pulses received by the pulser receiver 27 are validated by the receiver logic circuit 29.

Subsequently, the stored digital count from the counter 32 is transferred to a digital-to-analog converter, designated generally by the numeral 36, which converts the digital count to an analog voltage. The function of the digital-to-analog converter 36 is to provide an analog voltage corresponding to the digital count stored in the counter 32. This voltage is an indication of thickness for the associated channel. The continuous analog voltage, appropriately scaled, is displayed on a meter 37 (see FIG. 1) associated with that channel 22. This permits an operator to monitor continuously the thickness "d" of the cable jacket 12 at a portion of the periphery associated with the one channel.

In the alternative, the counter output stored in the buffer may be connected to a commercially available general purpose digital computer (not shown) so that data analysis and reduction may be accomplished.

In order to measure the eccentricity of the cable jacket 13, an eccentricity measuring circuit (not shown) is connected to the digital-to-analog converter 36 of each one of the channels 22—22. The eccentricity measuring circuit is designed to compare the jacket thickness "d" at the top and bottom of the cable jacket 13 as viewed in FIG. 1, and the jacket thickness at the left and right hand sides thereof. Of course, the comparative measurements need not be taken along horizontal and vertical axes but rather only at opposing intersections of the axes of a coordinate system with the cable jacket 13.

The eccentricity measuring circuit is designed to subtract the thickness of the bottom measurement from the measurement at the top of the jacket 13, as viewed in FIG. 1, with the result being multiplied by 100 and divided by the nominal jacket thickness to yield a per cent of nominal jacket thickness. A similar computation is made with respect to the thicknesses at the left and right hand portions of the cable jacket 13. Each of these measurements is displayed on a top-bottom meter 39 and a left-right meter 40 associated with the eccentricity measuring circuit not shown.

Figure 2:
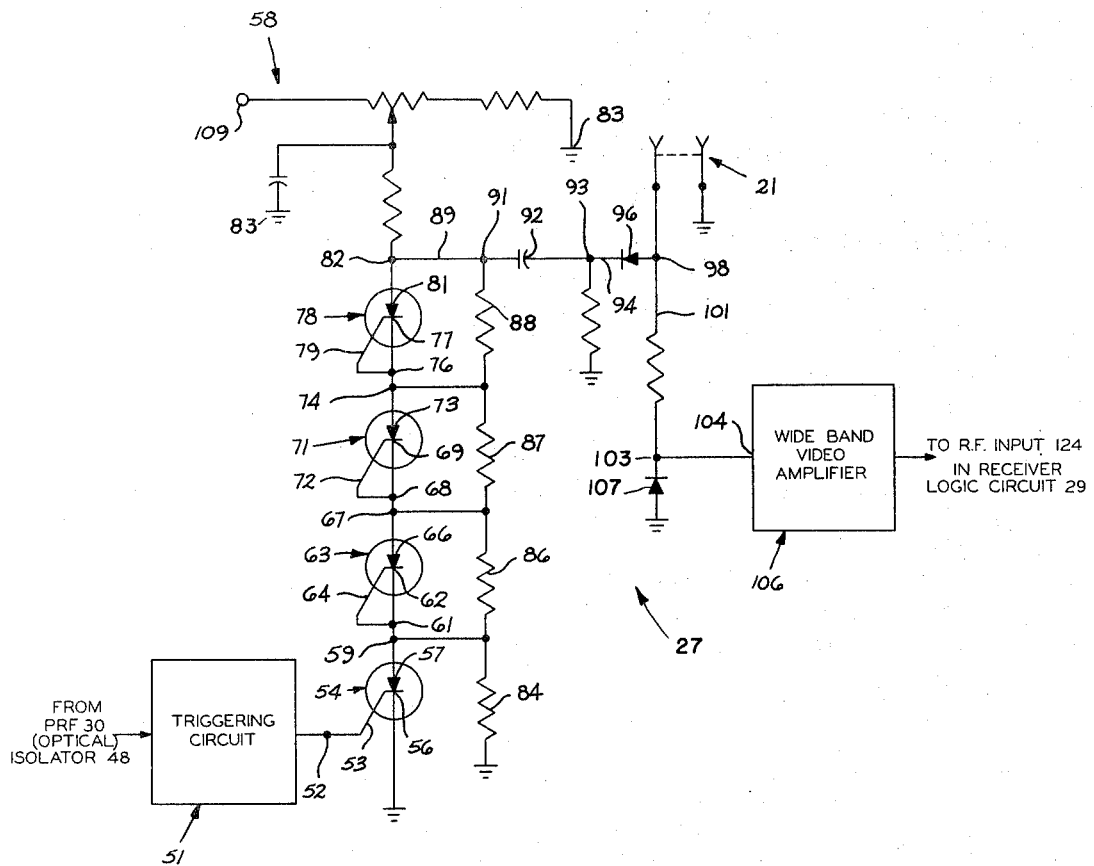
FIG. 2 is a detail schematic view of a pulser-receiver unit shown in FIG. 1 for exciting one of the transducers to emit pulses to the cable and for amplifying returning pulses.
Figure 3:
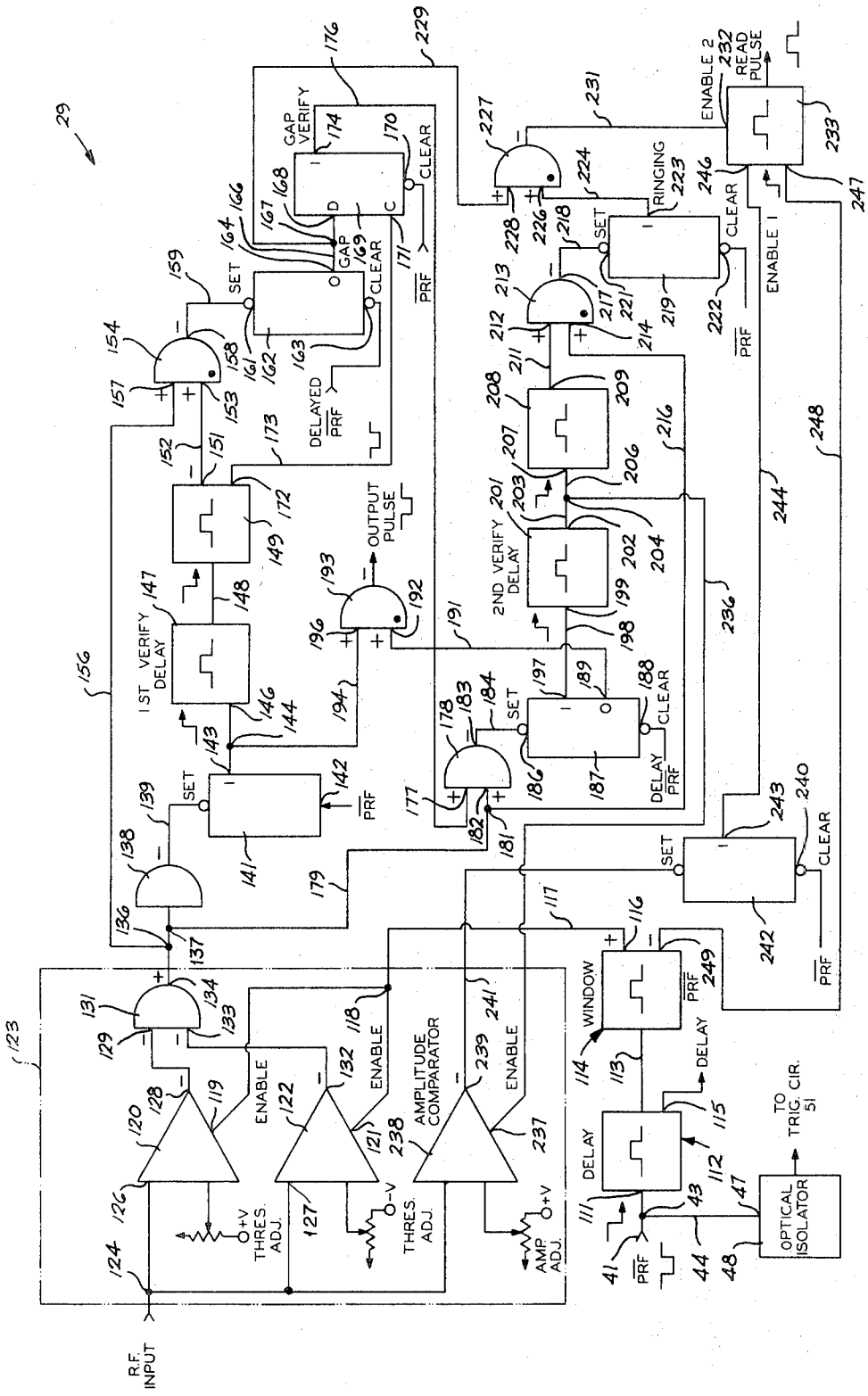
FIG. 3 is a detail schematic view of a receiver-logic circuit shown in FIG. 1 for discriminating among spurious signals and meaningful measurement signals to control the generation of a read pulse for validating a time interval indicative of the jacket thickness.

The pulse repetition frequency circuit 30 is designed to apply a so-called $\overline{PRF}$ signal (⎍) at a time referred to as the PRF time (see FIG. 4b) over the line 31 to a junction point 43 (see FIG. 3) of, for example the first channel and from there to an input 47 of a pulsing device, designated generally by the numeral 48 (see FIG. 3). The pulsing device 48 applies a pulse to the pulser-receiver 27 (see FIG. 2) to control the pulser-receiver to cause the associated transducer 21 to emit pressure waves.

Reference may be made to the hereinbefore identified copending application, Ser. No. 268,973, filed of even date herewith for a more detailed description of the overall apparatus 20. That application also discloses the pulser-receiver 27 and the receiver logic circuit 29.

DESCRIPTION OF THE PULSER-RECEIVER

The pulser-receiver 27 includes a triggering circuit, designated generally by the numeral 51 (see FIG. 2), to which is applied the pulse from the pulsing device 48 for causing the application of a current pulse to a junction point 52. The high current at the junction point 52 is then applied to a control electrode 53 of a first silicon-controlled rectifier (SCR) 54 to cause the first silicon controlled rectifier to fire.

The silicon controlled rectifier 54 is a commercially available device and may be a two-state semiconductor device having thyratron-like operating characteristics. The silicon-controlled rectifier 54, which is normally in a non-conductive state, includes a cathode 56 and an anode 57, the latter of which is biased in a forward direction by suitable external means such as a positive voltage source 58. The control electrode 53 is effective, when suitably energized by a biasing potential, to place the silicon controlled rectifier 54 in a conductive state.

As can be seen in FIG. 2, the anode 57 of the first silicon controlled rectifier 54 is connected serially through a junction point 59 and through a junction point 61 to a cathode 62 of a second silicon-controlled rectifier 63. The junction point 61 is connected to a gate 64 of the second SCR 63. An anode 66 of the SCR 63 is connected through junction points 67 and 68 to a cathode 69 of an SCR 71. The junction point 68 is connected to a control electrode 72 of the SCR 71. Finally, an anode 73 of the SCR 71 is connected through junction points 74 and 76 to a cathode 77 of an SCR 78, the junction point 76 being connected to a gate 79 of the SCR 78.

As can still be seen in FIG. 2, an anode 81 of the SCR 78 is connected through a junction point 82 to ground 83. The silicon-controlled rectifiers 54, 63, 71 and 78 have resistors 84, 86, 87 and 88, respectively, associated therewith and connected across in parallel. The junction point 82 is connected along a line 89 through a junction point 91 to which is connected the series of the resistors 84 and 86–88, and then through a capacitor 92 to a junction point 93. The junction point 93 is connected to a cathode 94 of a diode 96, an anode of which is connected through a junction point 98 to the associated one of the transducers 21—21. The diode 96 is effective to block out spurious noise signals, which are of low amplitude. If the diode 96 were not present, noise signals of low amplitude from the firing portion of the circuit would tend to move through the junction point 93 to the junction point 98 and tend to degrade echo signals from the associated transducer 21. In response to these low level noise signals, the diode 96 acts as an open circuit for either positive or negative excursions.

The blocking diode 96 is also connected through the junction point 98 along a line 101 through a resistor 102 to a junction point 103 and thence to an input 104 of a wide band video amplifier 106. In order to avoid the appearance of a large negative voltage at the input 104 of the amplifier 106 which would be damaging thereto, a diode 107 is inserted into a line 108 connecting with the junction point 103.

The wide-band, low noise, video amplifier 106, which is available commercially, receives, amplifies and then transmits return echo signals from the cable 12. The low level current return signals must be amplified to approximately a 1 to 3 volt level. The wide-band video amplifier 106 is selected so that the semiconductor devices used therein have low noise properties. In this way, the signals received and amplified for transmittal to the receiver logic circuit 29 will be stronger than the signals caused by noise and hence will permit accurate detection of the meaningful signals.

The provision of facilities in the pulser-receiver circuit 27 for reducing the noise level during a time period when echo pulses are accepted by the circuit 25 for testing is especially important when using the apparatus 20 to measure the thickness of an inner jacket. The pulse echoes received from the inner jacket are lower in amplitude than those received from an outer jacket. This is caused by the polyethylene surface being more irregular on the inner jackets. The slight peaks and valleys of the inner jacket reduce the target area of the cable, and, thus, cause less leading edge amplitude of the echo signals. Also, the slight peaks and valleys cause phase differences in portions of the electrical echo signals, which may add out-of-phase giving lower amplitudes. Although echo signal strength does vary between inner and outer jackets and between sizes of cable, a fixed gain system can be employed for all types of polyethylene cable.

The inner jacket shrinks about the cable core 11 and presents a somewhat irregular outwardly facing surface. In contrast, the outer jacket is extruded over a tubular metal shield which assists in causing the outwardly facing surface of the outer jacket to be rather uniform. This necessitates setting for a lower threshold pickup, again increasing chances for pickup of noise signals.

The diode 96 interposed between the pulse generator portion of the circuit which includes the silicon-controlled rectifiers 54, 63, 71 and 78 and the wide-band video amplifier 106 of the pulser-receiver 27 functions to raise the impedance level during the time in which the receiver 27 is "listening" for echoes. This permits better operation of the wide-band video amplifier from the standpoint of the effect of noise on the operation of the apparatus 20.

The diode 96 is positioned in the line 89 connecting the pulse generator or pulse shaping portion of the circuit 27 to the wide-band video amplifier 106 so that in a first direction, the circuit appears as an open. In the other direction, to the left, as viewed in FIG. 4, the diode 96 permits passage of a negative current pulsing the associated one of the transducers 21—21.

GENERAL DESCRIPTION OF RECEIVER LOGIC

The detection system embodying certain principles of this invention is tailored to the characteristics of the expected signals. For example, because of the known distance between the transducer 21 and the cable 12 together with the velocity of propagation of sound waves in a water medium, the time interval during which pulse echo signals may be expected is generally known. Therefore, the ultrasonic apparatus 20 is designed to accept pulse echo signals during this time interval only, which is referred to hereinafter as the "window width."

Experimental data showed that acoustical impedance for polyethylene decreased for higher temperatures. In particular, the first echo was much lower in amplitude than the second echo due to the greater acoustical mismatch at the second polyethylene surface. Also, the second echo signal had a much longer duration than the first echo signal. These signal characteristics are used to advantage in the design of the "intelligence" of the receiver logic circuit 29. On inner jacket measurements, where signal amplitudes would vary considerably due to surface irregularities, this "intelligence" is particularly beneficial. If echo amplitude or duration, momentarily drops below minimums, an incorrect measurement is not made. Instead, the last previous good measurement is retained in a register buffering the counter 32 to maintain a correct thickness output.

DETAILED DESCRIPTION OF RECEIVER LOGIC CIRCUIT

The receiver logic circuit 29 is designed to check the following expected signal characteristics:
(1) the signal echoes occur in a predetermined time span (the so-called window width) after the transmitted pulse, (2) the initial polarity of either echo is indeterminate, (3) the first echo is short in time duration compared to the second echo (see FIG. 4a), (4) a time interval of at least 200 nanoseconds exists between the first and second echo, (5) the amplitude of the second echo is greater than the minimum required of the first echo (see FIG. 4a), and (6) the second echo has a time duration of at least 0.700 microsecond. If these characteristics are met for a particular signal, the receiver logic circuit 29 issues a command in the form of a read pulse to the counter 32 to store a count recorded during the time 2t (see FIG. 4(h)) as valid data.

The junction point 43 is also connected to an input 111 of a monostable one-shot multivibrator, designated generally by the numeral 112 (see FIG. 3), which generates a delay pulse applied along a line 113 to a second monostable, one-shot multivibrator, designated generally by the numeral 114 and from an output 115 to other elements of the circuit. One output 116 of the multivibrator 114 is connected along a line 117 through a junction point 118 to an input 119 of a positive voltage threshold detector or comparator 120 and an input 121 of a negative voltage comparator 122.

The threshold detectors 120 and 122 are included in a comparator portion 123 of the receiver logic circuit 29. The threshold is a minimum predetermined amplitude and the detection thereof by the detectors 120 or 122 is useful for purposes of measuring a time interval. The threshold detectors 120 and 122 are set to detect at as low a level as possible, perhaps just above the noise level.

As is seen in FIG. 3, the comparator portion 123 of the circuit 29 includes an RF terminal input 124 which is connected to the wide band video amplifier 106. The input 124 is applied to inputs 126 and 127 of the threshold detectors 120 and 122, respectively.

The detectors 120 and 122 have a negative true output when the thresholds thereof are exceeded. As can be seen in FIG. 3, an output 128 of the threshold detector 120 is applied as an input 129 of a NOR gate 131, a logic element having negative logic. This nomenclature is interpreted to mean that should either the input 129 or another input 133 have a negative or low level voltage applied thereto, the character of the output is changed over that of the input, i.e., an output 134 of the NOR gate 131 will be a positive or high level. An output 132 of the detector 122 is applied to the other input 133 of the NOR gate 131. The output 134 of the NOR gate 131 is applied through junction points 136 and 137 to an inverter 138 which changes the polarity of the input signal and then along a line 139 to a flip-flop 141, a bistable element, to set the flip-flop.

The flip-flop 141 has a clear or reset input 142 connected to the pulse repetition frequency circuit 30 and has one output 143 thereof connected through a junction point 144 to an input 146 of a hold-off pulse generator, designated generally by the numeral 147. The hold-off pulse generator 147, which is a monostable, one-shot multivibrator, is connected through a line 148 to a validation pulse generator, designated generally by the numeral 149. The validation pulse generator 149 is also a monostable, one-shot multivibrator.

An output 151 of the multivibrator 149 is connected along a line 152 to an input 153 of a positive true NAND gate 154. Also, as can be seen in FIG. 3, the junction point 136 is connected along a line 156 to the other input 157 of the NAND gate 154. Should positive signals be applied simultaneously to the inputs 153 and 157 of the NAND gate, the character of the output changes over that of the input, i.e., a negative or low level appears at an output 158 thereof.

The output 158 of the NAND gate 154 is connected along a line 159 to a set input 161 of a flip-flop 162. The flip-flop 162 is reset by a delayed $\overline{PRF}$ signal. This is caused by the application of a reset signal to an input 163 of the flip-flop by the trailing edge of the delay pulse from the output 115 of the multivibrator 112.

Still referring to FIG. 3, an output 164 of the flip-flop 162 is connected along a line 166 through a junction point 167 to an input 168, referred to as the "D" input, of a flip-flop 169. A clock input, referred to as a "C" input, 171 of the flip-flop 169, is applied from an output 172 of the multivibrator 149 along a line 173.

The flip-flop 169 which is cleared by a pulse repetition frequency signal ($\overline{PRF}$) applied at an input 170 produces a signal at an output 174 and transmitted along a line 176 to one input 177 of a positive true NAND gate 178. The junction point 137 is connected along a line 179 through a junction point 181 to a second input 182 of the NAND GATE 178. An output 183 of the NAND gate 178 is connected along a line 184 to an input 186 of a flip-flop 187.

The flip-flop 187 has a reset input 188 from the pulse repetition frequency circuit 30 but which is delayed to the trailing edge of the pulse generated by the multivibrator 112. One output 189 of the flip-flop 183 is connected along a line 191 to an input 192 of a positive true NAND gate 193. Also, the junction point 144 is connected along a line 194 to the other input 196 of the NAND gate 193, the NAND gate producing a negative or low output pulse as shown in FIG. 3.

Another output 197 of the flip-flop 187 is connected along a line 198 to an input 199 of a monostable, one-shot multivibrator 201. The multivibrator 201 functions as a generator of a hold-off pulse for testing the characteristics of the second pulse echo. An output 202 thereof is connected along a line 203 through a junction point 204 and a line 206 to an input 207 of a second echo validation pulse generator designated generally by the numeral 208. The generator 208 is also a monostable, one-shot multivibrator.

An output 209 of the multivibrator 208 is connected along a line 211 to an input 212 of a positive true NAND gate 213 with another input 214 of the NAND gate connected back alonbg a line 216 to the junction point 181. The NAND gate 213 is adapted to produce a negative signal at an output 217 and then along a line 218 to set a flip-flop 219 through an input 221 thereof.

The flip-flop 219 is a so-called ringing flip-flop and has a reset input 222 from the pulse repetition frequency circuit 30. Moreover, the flip-flop 219 is adapted to produce a signal at an output 223, then along a line 224 to an input 226 of a positive true NAND gate 227. The NAND gate 227 is adapted upon application of positive or high signals at both of the inputs 226 and an input 228 connected along a line 229 to the junction point 167 to produce a negative or low level along a line 231 to an input 232 of a control or read pulse generator in the form of a monostable, one-shot multivibrator 233 to enable the multivibrator.

In order to test the peak amplitude of the second echo pulse, the junction point 204 is connected along a line 236 to an input 237 of an amplitude comparator 238 of the detector circuit 123. An output 239 of the comparator 238 is connected along a line 241 to a flip-flop 242. The flip-flop 242 also has a reset input 240 from the pulse repetition frequency sequencer 30. An output 243 from the flip-flop 242 is connected along a line 244 to an input 246 of the multivibrator 233.

Moreover, the multivibrator 233 is arranged and cooperates with other ones of the elements of the circuit 29 such that at the end of the "window-width," the multivibrator will, upon command, generate the read pulse. This causes the count to be stored in the memory bank (not shown). In order to look for a command at the end of the "window-width," the multivibrator 233 has another input 247 thereof connected along a line 248 back to an output 249 of the multivibrator 114.

It should be realized that the term "measure" or "test" or "monitor" as used herein is interpreted to mean the comparison of a quality to a reference quantity. For example, the threshold detectors 120 and 122 check to determine if the echo pulses are at least of the threshold amplitude. On the other hand, the comparator 238 determines whether the peak amplitude of the second echo pulse is greater than a predetermined magnitude. Of course, the apparatus 20 could be sophisticated so that the actual values of the time durations and the amplitudes could be determined.

Depending on the error rate which may be tolerated in the monitoring process, the apparatus 20 could be less sophisticated and still fall within the scope of this invention. For example, the channel 22 may be designed to check automatically thresholds of both pulses, peak amplitude of the second echo pulse with the testing of any second pulse recording being permitted after a preset time. This, of course, assumes that the first echo pulse having the required threshold is a valid pulse, which may or may not be true. In the alternative, the apparatus 20 may be designed to determine if the thresholds of both pulses are above a predetermined magnitude, if the peak amplitude of the second echo pulse is greater than a predetermined value, and if the duration of the first echo pulse is less than a preset value.

The preferred embodiment described herein records a time constant between the echo pulses if a sequence of first and second echo pulses are validated. The first pulse is validated if the amplitude is above a certain threshold and the duration less than a preset value. The second pulse is validated if the peak amplitude thereof is in excess of a preset magnitude and the duration greater than a preset duration. A valid sequence of associated first and second echoes must occur in the so-called window width.

The present invention also contemplates that not only may the actual values of pulse amplitude and duration be determined, but also the frequency content of the echo pulses for comparison to those associated with particular material of the jacket under test.

The sophistication of the present system is required because of the intended use thereof to measure dynamically cable jacket thickness while the cable 12 is being advanced. Then unlike in the measurement of tubing wall thickness, the measuring process must take into account the lateral motion of the relatively flexible cable and deformations in the jacket 13. In some prior art apparatus, manual adjustments must be made when cable sizes or other parameters are changed. Apparatus embodying the principles of this invention automatically adjusts to these changes.

Also, it is believed that this logic system must have the inherent intelligence to account for the relatively greater number of imperfections in the cable jacket 13 than are continuously experienced in the tubing art.

The term "facing" as employed in the specification and claims appended thereto when referring to the relationship between a surface and an object will be understood to mean that the surface is oriented in the direction of the object and may be, but is not necessarily, adjacent to or in contact with the object.

All of the logic elements, i.e., the NAND gates and the NOR gate, the bistable elements, i.e., the flip-flops and the monostable elements, i.e., the one-stop multivibrators are described in operation in terms of positive logic where a high or positive level voltage represents or exhibits a binary "1" and a low or zero level voltage represents a "0." Also, generally throughout the method of generation, the inputs and outputs of the various elements are described in terms of high or low levels. It is understood that this is to be interpreted in accordance with the description hereinbefore.

A positive true NAND gate produces a low level input only when a high level output is present on all inputs thereof. The output is a high level for any other combination of inputs.

A negative true NOR gate produces a high level output when there is a low level present on any input. Only when there is no input of a low levelis there a low leveloutput.

A flip-flop refers to a bistable multivibrator or similar circuit or device having two stable states. The flip-flop may have a plurality of inputs for being switched from one state to the other state with the application of an input thereto. Additionally, the flip-flop conventionally has two outputs, only one of which need be used. A high level or "1" output produces a low output voltage level and a "0" output produces a high output voltage level when the flip-flop is in a first reset or clear state. The output voltage levels are reversed when the flip-flop is set to a second state.

A one-shot multivibrator refers to a monostable multivibrator or similar circuit or device which upon application of a "1" to the input thereof, the input going from "0" to "1" or low to high, produces a single output pulse of "1" level having a selected duration. A delay one-shot refers to a multivibrator such that an output pulse of "1" level and of selected duration is produced a predetermined duration of delay after a "1" is applied to the input thereof.

An inverter refers to a device which produces a "0" output when a "1" is applied to the input thereof, and conversely, which produces a "1" output when a "0" is applied to the input thereof.

It should be observed that the application of the $\overline{PRF}$ signal to the reset or clear inputs of any of the conventional flip-flops resets the flip-flops. The resetting of the flip-flops causes the output terminals thereof which previously exhibited a high level to then exhibit a low level. The resetting likewise causes previously low level inputs to go high.

METHOD OF OPERATION

In describing the method of operation of the control circuit 25 in accordance with the principles of this invention, reference will be made to FIGS. 1, 2 and 3. The pulse repetition frequency circuit 30 applies a pulse along the line 41 to the junction point 43 and then along the line 44 to the pulsing device 48. Then, the optical isolator 48 applies a triggering pulse to the triggering circuit 51.

The triggering circuit 51 applies a positive potential to the control electrode 53 to cause the firing of the first silicon controlled rectifier 54 which applies an excessive anode to cathode potential to cause the second SCR 63 to fire. Similarly, the other two silicon controlled rectifiers 71 and 78 are fired.

The four silicon controlled rectifiers 54, 63, 71 and 78 are capable of withstanding the applied potential as evenly divided by the resistors 84 and 86–88. However, when the first silicon controlled rectifier 54 is rendered conductive, the remaining three cannot withstand the applied potential and break down as hereinbefore described.

This successive firing of the four serially connected silicon controlled rectifiers 54, 63, 71 and 78 causes the capacitor 92 to discharge to apply a voltage pulse to the associated transducer 21. The pulse applied to the transducer 21 is a negative pulse of 200–250 volts in magnitude and of approximately 60 nanoseconds in duration and is applied through the diode 96 along the line 98 to ground. The application of this pulse to the transducer 21 causes the transducer to generate pressure waves which engage with the sections of the aligned jacketed cable 12.

An instant after the silicon controlled rectifiers 54, 63, 71 and 78 fire, the potential at the junction point 91 is low, substantially zero, while that at the junction point 93 is approximately 200–250 volts. This causes the capacitor 92 to discharge. The capacitor 92 is chosen so as not to discharge instantaneously. Rather, the capacitor 92 discharges over a period of time from the diode 107 through the junction point 98 and the diode 96. Also, the capacitor discharges through the silicon controlled rectifiers until there is substantially zero potential across the capacitor.

Then current is drawn from the source 109 to recharge the capacitor 92 to the original state thereof. Current in the silicon-controlled rectifiers is applied from the SCR 78 in the direction toward the SCR 54. Moreover, the current drops from the several amps peak current to below that level whereupon the silicon controlled rectifiers become non-conducting. It should be observed that this occurs after the trigger pulse has passed and before the occurrence of the next succeeding trigger pulse.

GENERAL OVERALL DESCRIPTION OF OPERATION OF RECEIVER LOGIC CIRCUIT

The receiver logic circuit 29 is designed to test the validity of echo pulses received in accordance with predetermined test characteristics determined at least in part by the material of the jacket 13 under test.

The receiver logic circuit 29 is designed to yield a positive going pulse should the echo pulses received by the pulser-receiver 27 be within a predetermined amplitude range. The receiver logic circuit 29 includes logic circuitry for making outside and inside band determinations for the echo pulses. Should the amplitude of the echo pulses received by the pulser-receiver 27 be in excess of a predetermined amplitude, the circuit will register a negative or outside band pulse.

Figure 4:
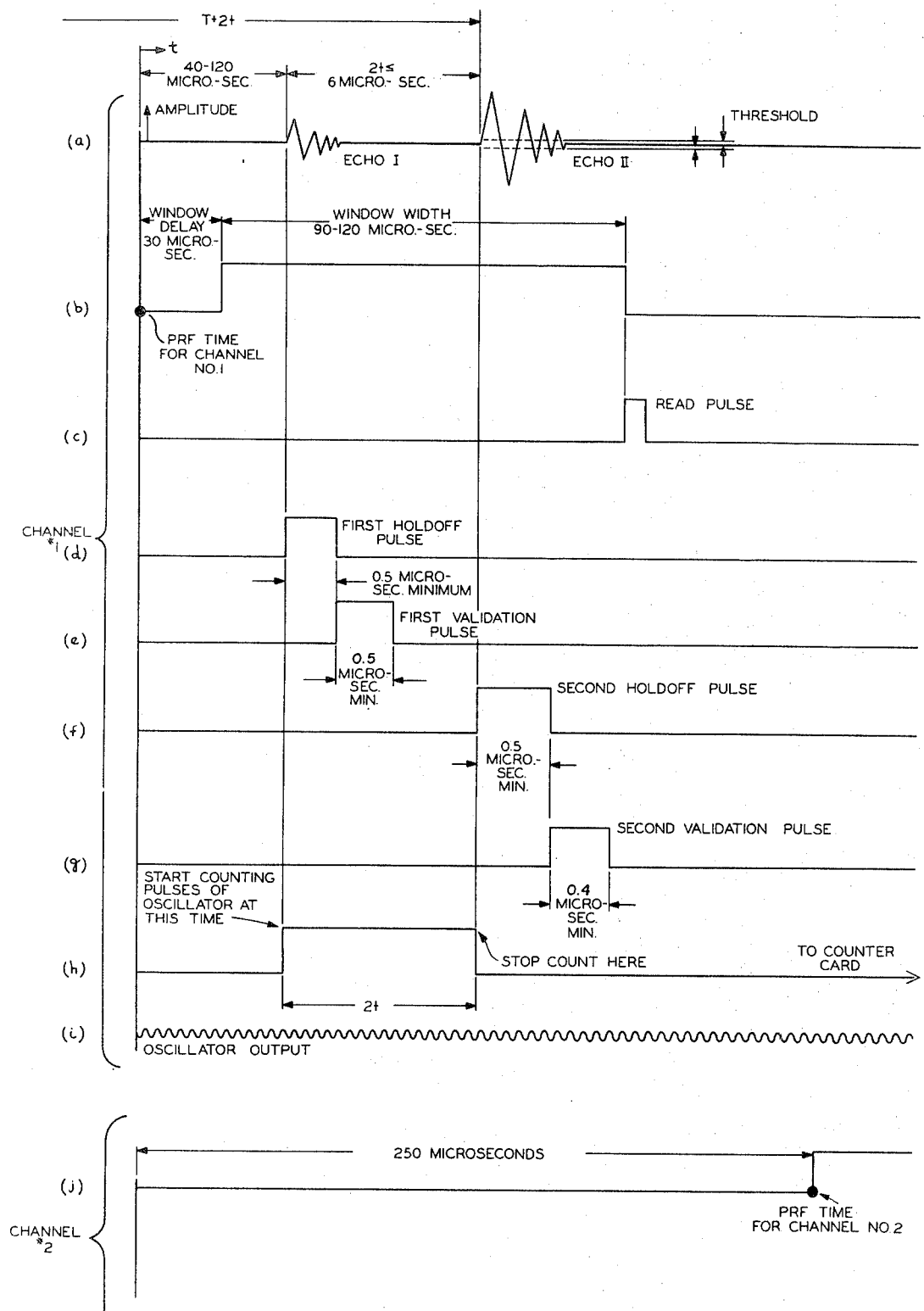
FIG. 4 is a graph showing wave forms associated with the operation of the units of the apparatus shown in FIG. 1 and having appropriate legends for indicating the various curves thereof.

A valid set of pulse echoes received by the pulser-receiver 27 are spaced a time 2t apart as shown in FIG. 4 with the first echo pulse, designated I, occurring approximately 40–120 microseconds after the initiation of the cycle. The first echo pulse occurs when the pulse emitted by the associated ringing transducer crystal 21 engages the outwardly facing surface of the jacket 13. The second echo pulse, designated II, occurs when the unreflected portion of the pulse emitted by the transducer crystal strikes the inwardly facing surface of the jacket 13.

The amplitude of echo pulse I is a function of the acoustical impedance mismatch between the hot polyethylene jacket and the water in the cooling trough 16. The amplitude of the echo pulse II is a function of the acoustical impedance mismatch between the hot polyethylene jacket and the core 11. Moreover, the first echo pulse is lower in amplitude and duration than the second echo pulse.

During the "window-width" (of approximately 90–120 microsecond duration, see FIG. 4b) a hold-off pulse (see FIG. 4d) is generated by the receiver logic circuit 29 upon receiving a first echo with a validation pulse (see FIG. 4e) beginning immediately after the first hold-off pulse ends. It is desirable that the first validation pulse occur after the amplitude decay of the first echo pulse. If the receiver logic circuit 29 indicates a positive or high output 158, then it is known that a valid first pulse has occurred. Thereafter, at the beginning of the second echo pulse, a second hold-off pulse is generated with a second validation pulse beginning at the conclusion of the second hold-off pulse. The second validation pulse should occur, unlike the first validation pulse, during the decay of the second echo pulse. Consequently, the portion of the circuit associated with the second validation pulse should give a negative output 217 which indicates that the second echo pulse is outside of the predetermined limits of the threshold band.

It should be observed that if the receiver logic circuit 29 receives a negative output from an apparent first echo, the receiver logic circuit does not look for a second echo and hence does not generate a read pulse for the first cycle.

The validation pulse also avoids the false pickup of noise signals which may be due to air bubbles in the water medium of the cooling trough 16. If a noise signal precedes the first echo pulse, the circuit picks up the noise signal as a first echo and subsequently attempts to validate the true first echo as an apparent second echo. Should this occur, the receiver logic circuit 29, not receiving the expected positive-negative sequence durations at outputs 158 and 217 respectively, does not cause the read pulse to be generated.

Additionally, the pulse repetition frequency circuit 30 controls the operation of the channels 22—22 and the interaction thereof. In order to accomplish this, the pulse repetition frequency circuit 30 generates four pulse repetition rate signals, one for each of the channels 22—22, each with approximately a 1 millisecond period. The four pulses are staggered by approximately 250 microseconds (see FIG. 4j), thereby causing the staggering of the operating sequence of the four channels. In this way, and starting with the top channel 22, proceeding then to the bottom, then left and right channels, all of the activity of significance in the top channel occurs within the first 250 microseconds prior to the generation of the shifted pulse associated with the bottom channel.

The pulse repetition frequency circuit 30 conditions the logic circuit 29 for each cycle of operation. A pulse (a $\overline{PRF}$ pulse defined as a negative true pulse) from the PRF circuit is applied to the high level or "1" inputs 142, 170, 222 and 240 of the flip-flops 141, 169, 219 and 242, respectively, to reset or clear those outputs to a low or "0" level. The application of the $\overline{PRF}$ pulse is regarded as the beginning of a test cycle.

The pulse repetition frequency circuit 30 also controls the receiver logic circuit 29 to accept echo pulses only during the predetermined time interval referred to as the window width (see FIG. 4b). The pulse from the PRF circuit 30 is applied to the input junction 111 of the monostable one-shot multivibrator 112.

The multivibrator 112 causes a window (see FIG. 4) of a predetermined duration. The delay pulse is applied to the reset input 163 of the flip-flop 162 to cause the "0" or low level output 164 thereof to exhibit a high level. Also, the delay pulse is applied to a reset input 188 of the flip-flop 187 to cause the high level output 197 to assume a low level and the low level output 189 to assume a high level.

The trailing end of the delay pulse applied over the line 113 to the multivibrator 114 causes the multivibrator 114 to generate a window-width pulse (see FIG. 4). The so-called "window-width" of the window pulse is the time interval in which the channel 22 will receive valid pulse echoes from those emitted to the cable 12 from the associated one of the transducers 21—21 and hence avoid stray pulses. The end of the window pulse is regarded as the end of a test cycle. At that time the receiver logic circuit 29 is caused to make a decision as to whether or not to generate a pulse for further controlling the processing of measurements attributed to receipt of echo signals.

The window pulse is transmitted from the output 116 over a line 117 and applied to the junction point 118. The application of the signal from the window pulse generation portion of the circuit 29 to the junction point 118 enables the threshold detectors 120 and 122.

The threshold detection circuit 123 includes facilities for detecting a positive or a negative echo pulse return signal as applied by the wide-band video amplifier 106 to the input terminal 124. It should be observed from FIG. 3, that only when the window signal appears at the junction point 118 are the pair of threshold amplitude detectors 120 and 122 enabled.

The threshold amplitude detector 120 is designed to apply a negative assertion signal to the input 129 of the NOR gate 131 in response to the application of a valid positive echo pulse to the input terminal 124 of the threshold detection circuit 123. On the other hand, the threshold amplitude detector 122 is designed to also apply a negative assertion signal to an input 133 of the NOR gate 131 in response to a valid negative echo pulse.

The threshold detection circuit 123 is designed to apply a signal to the NOR gate 131 only when the first echo pulse is a predetermined minimum amplitude or threshold value. An echo pulse of at least the predetermined amplitude is said to be outside band and causes one of the amplitude detectors 120 or 122 to generate a negative signal. If the amplitude is not at least the predetermined amplitude, the amplitude is said to be inside band and the negative does not appear.

As the polyethylene jacket 13 cools, the amplitude of a pulse echo from the jacket increases. The present system is designed for measurement of thickness and eccentricity as close to the extruder as possible. Hence, the measurement herein will be that of hot polyethylene material. The detectors 120 and 122 are selected and adjusted to detect pulses that are only of a predetermined minimum magnitude which corresponds to that expected at the outwardly facing surface of the polyethylene jacket 13.

Subsequently, the receiver logic circuit 29 tests the first echo pulse to determine if the first echo pulse is not greater than a predetermined duration. Experiments have shown that the first pulse to be expected from the interface of the water and the outwardly facing surface of the polyethylene is of a very short duration, e.g., on the order of ½ microsecond. Contrasted to this, the second pulse echo from the interface of the inwardly facing surface of the polyethylene and the core or the shielding layer is of a duration on the order of 1–2 microseconds. This is due to the polyethylene tending to filter out high frequency energy and the greater reflection at the second interface. Hence, any signals to be valid must meet criteria established with respect to both time duration and amplitude.

Should the amplitude of the first echo pulse exceed a predetermined value, the threshold detector 120 or 122 applies a signal to the input terminal 129 or 133, respectively, of the NOR gate 131. This is turn causes output 134 of the NOR gate 131 to exhibit a high level and to apply the positive or high voltage level signal through the junction point 136 and 137 into the inverter 138. The inverter 138 then applies a negative signal over the line 139 to the flip-flop 141. This sets the output 143 of the flip-flop 141 to a high level voltage to cause a high level to appear at the junction point 144.

The flip-flop 141 may only be cleared by the application of the $\overline{PRF}$ signal at the beginning of the subsequent measurement cycle.

The high voltage level at the junction point 144 is applied as a true input to the input 196 of the NAND gate 193. As is seen in FIG. 2, the delayed $\overline{PRF}$ pulse applied to the input 188 of the flip-flop 187 at the beginning of each cycle of operation resets the output 189 to a high level thus causing a positive true to appear at the input 192 of the NAND gate 193. This causes the NAND gate 193 to generate a negative output pulse which signifies the beginning of the measurement cycle and causes the counter 32 to begin counting.

The reason for the application of a delay $\overline{PRF}$ pulse to the input 188 deserves a word of explanation. Should there be a high level at the output 143 of the flip-flop 143 and a $\overline{PRF}$ pulse applies to the inputs 142 of the flip-flop 141 and 188 of the flip-flop 187, the flip-flop 187 may respond more quickly than the flip-flop 141 with positive trues then appearing at both inputs 196 and 192 of the NAND gate 193. But then when the flip-flop 141 is reset, the output 143 assumes a low level which would cause a low level at the output 196 thereby discontinuing the pulse output of the NAND gate 193 and hence the oscillator pulse count. This would cause a negative pulse of short duration output at the NAND gate 193.

To avoid this, a delay $\overline{PRF}$ pulse is applied to the input 188 of the flip-flop 187. This delays the reset of the output 189 to a high level to apply a high level at the input 192 of the NAND gate 193 until after the reset of the output 143 of the flip-flop 141 has occurred and the essential setting thereof by at least a partially valid threshold pulse I.

The appearance of a high level at the junction point 144 indicates at least a partially valid first echo. A check is initiated to verify this assumption by determining that the duration thereof is approximately 500 nanoseconds and that a time interval or gap occurs thereafter when no signal is present. To this end, the high level at the junction point 144 also causes a high level to be applied to the input 146 of the first holdoff pulse multivibrator 147. The signal at the junction point 144 indicates the presence of a valid pulse echo insofar as amplitude is concerned as determined by one of the threshold detectors 120 or 122.

The application of a signal to the junction point 144 causes the holdoff multivibrator 147 to generate a time delay or holdoff pulse (see FIG. 4d) to determine if the first pulse is of valid time duration, e.g., ½ microsecond to qualify as a valid first echo pulse. The holdoff pulse multivibrator 147 is designed to generate a holdoff pulse of a predetermined time length which in this situation is about ½ microsecond. After the ½ microsecond, the trailing edge of the holdoff pulse causes the validation pulse multivibrator 149 to generate a pulse (see FIG. 4e) of approximately 500 nanoseconds.

During this time, the pulse causes a high level to appear at the input 153 of the NAND gate 154 to enable the NAND gate. Should the echo pulse have a threshold amplitude for a duration exceeding the holdoff pulse, a high level is applied over the line 156 to the input 157 of the NAND gate 154 from the junction point 136. This causes an assertion of both positive true inputs of the NAND gate and cause a low level to appear at the output 158 thereof.

If the echo pulse exceeds threshold after the holdoff pulse and during the validation pulse, which would indicate that a valid pulse echo I has not been received because of excessive time duration, the measurement of signal is discarded; if not, the signal is remembered.

The output 164 of the flip-flop 162 is reset or cleared to a high level by the delayed $\overline{PRF}$ pulse as applied to the input 163. If the NAND gate is operated to have a low level at the output 158 indicative of an echo pulse longer than 500 nanoseconds, the flip-flop 162 is set by the low level at the input 161 thereof to cause a low level at the output 164 thereof. The low level at the output 164 appears at the junction point 167 and at the so-called "D" input 168 of the flip-flop 169.

If the "D" input of the flip-flop 169 is a low level when the clock or "C" input 171 occurs, which is at the positive trailing edge of the validation pulse generated by the multivibrator 149, the output 174 appears low. This corresponds to a no gap situation, i.e., the first echo pulse is not a valid one. If the output 174 appears low, the NAND gate 178 is not operated and the output 174 remains low. The next $\overline{PRF}$ pulse tends to reset the flip-flop 169. However, since the flip-flop output 174 is already low, the output remains low.

On the other hand, if the amplitude of the first echo pulse does not exceed threshold level beyond the holdoff pulse (which indicates a valid first echo pulse), a high does not appear at the input 157 of the NAND gate 154. Consequently, the NAND gate 154 is not operated and does not set the flip-flop 162 and the high at the output 164 appears at the "D" input 168 of the flip-flop 169. Since "D" is high when the clock "C" occurs at the input 171, the output 174 is high thereby causing a high at the input 177 of the gate 178 to enable the gate. The output 174 remains high until the next cycle of operation when the PRF pulse resets the flip-flop 169 and causes the output to exhibit a low level.

Should a high occur at the input 177 of the gate 178, the circuit 29 has in effect validated the first echo pulse as to time and duration. This permits the remainder of the circuit 29 to being looking for a second echo pulse.

The high appearing at the junction point 167 causes a high at the input 228 of the NAND gate 227 to enable the gate. The enabling of the NAND gate 227 is such that if the associated second pulse received is validated as to duration and threshold amplitude, the NAND gate facilitates the generation of a read pulse to cause the count in the counter 32 to be retained.

When the second echo pulse is received by the input 124 of the circuit 29, one of the threshold detectors 120 or 122 functions as described hereinbefore to cause the NAND gate to generate a high at the output 134 thereof. This causes a high to be applied over the line 179 and through the junction point 181 to the input 182 of the already enabled NAND gate 178 to operate the NAND gate.

The operation of the NAND gate 178 (which is due in part to the receipt of the second echo pulse) causes a low level at the output 183 to appear at the input 186 of the flip-flop 187 to set the flip-flop. This conditions the receiver logic circuit 29 to look at the second echo pulse. Also, this indicates the end of the counting cycle (see FIG. 4). The setting of the flip-flop 187 causes a low at the output 189 and hence a low level to appear at the input 192 of the NAND gate 193 to disable the NAND gate and discontinue the production of a low at the output thereof. This causes a discontinuance of the count of the oscillator output by the counter 32 (see FIG. 4h).

The remainder of the cycle is devoted to determining the validity of the second echo which would cause the count to be transferred to the buffer (not shown). A validation process is used for the second echo pulse similar to that used to validate the first echo pulse. It will be remembered that the second echo pulse will have a duration on the order of magnitude of ½-2 microseconds. Hence, the portion of the receiver logic circuit 29 which examines the second pulse is constructed with a built-in delay of 1 microsecond. Only then is the pulse examined, and if there is yet threshold amplitude, the pulse is remembered.

The setting of the flip-flop 187 causes the low at the output 197 to go high and be applied along the line 198. The rising edge of the pulse from the flip-flop 187 causes the second holdoff pulse generator 201 to generate a pulse having a duration of approximately 1.0 microsecond.

When the holdoff delay pulse is generated by the multivibrator 201, a signal is sent from the junction point 204 along the line 236 to an input 237 of the amplitude comparator 238 to enable that amplitude comparator. The positive amplitude of the second pulse is checked by the comparator 238 to determine if the amplitude of the second echo exceeds a preset value which is much greater than that of the initial threshold. The amplitude comparator 238, as shown in FIG. 3, checks only positive signals; however, it is within the scope of this invention to include another comparator in the circuit 123 for testing the signal for negative excursions.

In the event that the maximum amplitude of the comparator is exceeded, the comparator 238 applies a low level along the line 241 to an input of the flip-flop 242 to set the flip-flop and cause a high level to appear at the output 243 thereof. The high level at the output 243 is applied along the line 244 to apply the signal to the input 246 of the multivibrator 233 to enable the multivibrator.

The trailing edge of the pulse generated by the multivibrator 201 appears at the multivibrator 208 and causes the second pulse validation multivibrator 208 to generate a validation pulse (see FIG. 6g) of approximately 400 nanoseconds. The second validation pulse multivibrator 208 causes a high to be transmitted from the output 209 along a path 211 and applied to the input 212 of the NAND gate 213.

Also, as is seen in FIG. 3, if either the positive or negative threshold is exceeded during the duration of the validation pulse, a signal is applied from the junction point 137 along the line 139 to the junction point 181 and then along the line 216 and applied as a high to the input 214 of the NAND gate 213. The threshold testing of the second echo pulse is necessary in order to determine if there is in fact an excursion.

Should highs be applied to the input 214 from one of the threshold detectors 120 or 122 indicating the second pulse echo is present, and to the input 212 from the multivibrator 208, a low level appears at the output 217 to set the flip-flop 219. The setting of the flip-flop 219 causes a high level to appear over the line 224 and at the input 226 of the NAND gate 227 which had been enabled previously.

The NAND gate 227 is operated and then applies a low over the line 231 to the one-shot multivibrator 233 which is designed to generate the read pulse and which had been enabled previously by the amplitude validation.

The generation of a low level pulse by the NAND gate 227 and applied to the multivibrator 233 (see FIG. 3) indicates that the first pulse was less than one microsecond duration with an appropriate gap to the second echo pulse and that the second echo pulse was of ½–2 microseconds in duration.

Upon cessation of the window pulse, a decision is made as to whether or not to generate the read pulse. The cessation of the window pulse is indicated by a signal applied by the one-shot monostable multivibrator 114 over the line 248 to the input 247 of the multivibrator 233. The multivibrator 233 previously enabled by an input 246 from the multivibrator 242 now has an input applied thereto from the NAND gate 227. The multivibrator is now operated to instruct the counter 32 to record the pulse width from the NAND gate 193 upon receiving the trailing edge of the window pulse at the input 247.

The oscillator 34 generates pulses which are counted by the counter 32 beginning at the initiation point on the first hold-off pulse and ending at the initiation of the second echo pulse with the differenece therebetween being a measure of the time interval between the pulse echoes. The counter 32 includes three decade counters, hundreds, tens and units, with a 4-bit memory associated with each of the decade counters. If appropriate pulses are generated at 158 and 217 with respect to associated echo pulse pairs in a positive-negative sequence, then a read pulse is generated at the conclusion of the "window-width" of the window-pulse. This causes the count stored in the register of the counter 32 to be transferred from the counting portion of the counter into the memory of the counter. Then the count from the memory is applied to the digital-to-analog converter 36 to direct the digital-to-analog converter to provide a continuous voltage output indicative of the jacket thickness.

It should be noted that the previous count stored in the buffer is not updated until the next subsequent valid read pulse is generated to transfer the associated count to the buffer. The circuit 25 is designed so that a previous count is held in the buffer until the next valid count is received and is not discarded if an invalid count is made.

In addition, the digital-to-analog converter includes a light which is driven for approximately 800 microseconds between successive ones of the read pulses. Four of the lights are associated with the apparatus 20. If acceptable measurements are being made, the lights will be in an on condition approximately 80 to 90 per cent of the time. On the other hand, if the signal is lost there will be no light at all which may be indicative of an out-of-position crystal 21 or a defective channel. The light for each of the channels 22—22 is used as a warning light to the operator should the system fail and also during the set-up of the apparatus. The light is on continuously if a continuous stream of read pulses are generated. An 80% duty cycle signal would drive the light under such a condition. When a cable oscillates through the field of view of the crystal, the light will tend to flicker as no excitation will be present when the crystal cannot "see" the cable.

The apparatus 20 has certain features which may be traced to the thickness of the jacket 13 under test. Generally, jackets 13—13 which have a thickness of at least 20 mils present no problem. However, if the jacket thickness is below that, problems may be encountered. The receiver logic circuit 29 is designed with respect to the first holdoff pulse generation and validation portion to accommodate 20 mils per microsecond.

For example, the holdoff pulse multivibrator 147 must generate a holdoff pulse at least equal to the ringing delay time of the associated crystal 21. It is possible to select a crystal that has a decay time as low as 0.5 microsecond.

Then, the validation pulse generator 149 must generate a pulse of a duration of at least equal to one cycle of the ringing of the associated crystal 21. The crystal 21 may ring at 5 megacycles so that the pulse width may be as low as 200 nanoseconds.

With these two durations determined, the successful operation of the apparatus 20 is dependent upon the second echo (echo II) not being received until the conclusion of the first holdoff and validation process for the first echo. This requirement may not be met if the apparatus 20 is used to measure jackets having a thickness of the order of magnitude of less than 20 mils.

Of course, with some of the more commonly used plastic insulating materials for the thinner wall jackets, the time between echo pulses is longer because the speed of the ultrasonic pressure wave in that particular material may be slower. In hot polyethylene, the expected speed is 20 mils per microsecond. So for polyethylene, to go to a jacket thinner than say 20 mils may involve problems in echo pulse overlap. However, for a given thickness in hot polyvinyl chloride, the time lapse between echoes I and II may be longer so that even though the jacket is thinner, any overlap is avoided.

Of course, it must be understood that it is within the scope of this invention to measure the thickness between a first surface and a second surface spaced from and opposite to the first surface with several layers of differing materials therebetween. Also, instead of measuring a cable jacket thickness, the methods and apparatus would be used to measure the thickness of successive sections of a covering layer enclosing successive sections of a solid core or a hollow core as in tubing.

It should be noted that in some cable structures where, for example, an inner jacket, is in engagement with a core wrap or other material that the second echo pulse of each associated echo pulse pair is stretched out. However, it will be remembered that the development of the off signal by the NAND gate 193 occurs upon receipt of the initial portion of the second echo pulse for purposes of thickness measurement. Also, of course, the peak magnitude and duration characteristics of the second echo pulse will be satisfied. On the other hand, if the core wrap is spaced from the inwardly facing surface of the jacket, the air acts as an open switch through which there is substantially no transmission. Again, the testing and use of the second echo pulse in the thickness measurement is not impaired.

It is to be understood that the above-described arrangements are simply illustrative of the principles of the invention. Other arrangements may be devised by those skilled in the art which will embody the principles of the invention and fall within the spirit and scope thereof.

What is claimed is:

1. A method of measuring ultrasonically the thickness of an elongated member in which an on signal and an off signal are developed in response to the receipt of first and second associated echo pulses of predetermined test characteristics from one surface and an opposite surface, respectively, of the member and in which relative motion is caused to occur between the successive sections of the elongated member and a source of ultrasonic pulses, which includes the steps of:

establishing a test period during which echo pulses are tested;

transmitting an ultrasonic pulse into the member and then receiving a first echo pulse reflected from the one surface of the member and then receiving an associated second echo pulse from an opposite surface of the member; while excluding extraneous low level signals;

testing the first echo pulse and then an associated second echo pulse for a qualifying predetermined minimum amplitude;

initiating in response to receiving a qualifying first echo pulse the development of the on signal and the examination of a validating duration characteristic of the first echo pulse;

conditioning partially in response to the first echo pulse being validated facilities for enabling the generation of a control pulse;

initiating in response to the validation of the first echo pulse and the receipt of a qualifying associated second echo pulse and examination of validating test characteristics of a qualifying associated second echo pulse; while causing the development of the off signal with the time duration between the on signal and the off signal being related to the elapsed time between the receipt of the first echo pulse from the one surface and the receipt of the associated second echo pulse from the opposite surface;

measuring the elapsed time between the on signal and the off signal;

completing the conditioning of the enabling facilities in response to validating the associated second echo pulse to generate the control pulse; and converting the measured elapsed time in response to the generation of the control pulse into a signal the magnitude of which is proportional to the thickness of the elongated member.

2. The method of claim 1, wherein the characteristic for completing the validation of a qualifying first echo pulse is that the duration during which the predetermined minimum amplitude of the first echo pulse occurs is less than a preset time.

3. The method of claim 2, wherein the test characteristic for completing the validation of the associated second echo pulse includes a peak amplitude and a duration in excess of preset values.

4. The method of claim 1, wherein the transmitting of ultrasonic pulses includes the exciting of a transducer immersed in a coupling medium and spaced from the elongated member.

5. A method of measuring ultrasonically the thickness of successive sections of an elongated member in which an on signal and an off signal are developed in response to the receipt of first and second associated echo pulses of predetermined test characteristics from one surface and an opposite surface, respectively, of the member and in which relative motion is caused to occur between the successive sections of the elongated member and a source of ultrasonic pulses, which includes the steps of:

establishing a test period during which echo pulses are tested;

transmitting an ultrasonic pulse into the member and then receiving a first echo pulse reflected from the one surface of the member and an associated second echo pulse from an opposite surface of the member; while excluding extraneous low level signals;

testing the first echo pulse and then an associated second echo pulse for a qualifying predetermined minimum amplitude;

initiating in response to receiving a qualifying first echo pulse the development of the on signal and the examination of a validating duration characteristic of the first echo pulse;

conditioning partially in response to the first echo pulse being validated facilities for enabling the generation of a control pulse, a valid first pulse being one in which the predetermined minimum amplitude occurs only during a preset time;

initiating in response to the validation of the first echo pulse and the receipt of a qualifying associated second echo pulse the examination of a validating duration characteristic of a qualifying associated second echo pulse; while causing the development of the off signal with the time duration between the on signal and the off signal being related to the elapsed time between the receipt of the first echo pulse from the one surface and the receipt of the associated second echo pulse from the opposite surface;

measuring the elapsed time between the on signal and the off signal;

completing the conditioning of the enabling facilities in response to validating the associated second echo pulse to generate the control pulse, a valid second echo pulse being one in which the minimum amplitude occurs within a preset duration; and determining the thickness of the elongated member by converting the measured elapsed time in response to the generation of the control pulse into a signal indicative of the thickness of the elongated member.

6. The method of claim 5, wherein the transmitting of ultrasonic pulses includes the exciting of a transducer immersed in a coupling mediun and spaced from the elongated member.

7. The method of claim 5, wherein the elongated member is a cable jacket, the surfaces defining the thickness of the jacket, and which includes the steps of:

initiating in response to the validation of the first echo pulse and the receipt of a qualifying associated second echo pulse the examination of the peak amplitude of a qualifying associated second echo pulse;

a valid second echo pulse having at least a predetermined peak amplitude.

8. The method of claim 7, wherein the transmitting of ultrasonic pulses includes the exciting of a transducer immersed in a coupling medium and spaced from the cable.

9. The method of claim 8, wherein a pair of transducers are positioned in alignment with diametrically opposed points on the jacket of the cable, wherein the transducers are pulsed cyclically sequentially and which also includes the step of:

determining the eccentricity of the cable jacket by processing the thickness measurements of the jacket at the diametrically opposed points.

10. A method of controlling the operation of an apparatus for measuring the thickness of successive sections of a cable jacket, in which relative motion is being caused between the apparatus and the cable, and in which signal pulses are received with a predetermined sequence of pulses of predetermined test characteristics capable of causing the development of signals having a relationship therebetween which is related to a parameter being measured, which includes the steps of:

establishing a time interval during which signal pulses are tested; while enabling the comparison of a first pulse received from an outwardly facing surface of the cable jacket and then an associated second pulse from an opposite inwardly facing surface of the cable jacket with respect to reference amplitude levels;

developing automatically an on signal upon receipt of a first pulse of a predetermined minimum amplitude from the one surface of the jacket;

testing the duration of the first pulse at the minimum amplitude;

developing an off signal upon the validation of the first echo pulse and the receipt of an associated second echo pulse of a predetermined minimum amplitude from the opposite surface of the jacket with the second pulse occurring a predetermined time interval following the beginning of the first pulse;

the time duration between the on signal and the off signal being related to the elapsed time between the receipt of the first pulse from the one surface of the jacket and the receipt of the associated second pulse from the opposite surface of the jacket;

measuring the elapsed time between the on signal and the off signal;

the amplitude of the first pulse being less than the minimum amplitude after a preset time being a partial prerequisite to enabling a generator for generating a pulse to control the disposition of the measured elapsed time;

examining an associated second pulse for peak amplitude and a duration characteristic in response to validating a first pulse;

the verification of duration of the second pulse being a second partial prerequisite for enabling the pulse generator;

the verification of the peak amplitude of the associated second echo pulse completing the enabling of the pulse generator;

initiating a cycle of operation while conditioning the circuit for another cycle of operation, the end of each test cycle operating the pulse generator if previously enabled; and converting the elapsed time into a measurement indicative of the thickness of the jacket.

11. A method of discriminating among pulses received from a sensor to indicate the receipt of a sequence of valid associated pulses, which includes the steps of:

permitting after a predetermined delay the testing of pulses within a predetermined time interval;

enabling the testing of one parameter of a first pulse upon the receipt thereof;

developing an on signal upon receipt of a first pulse having a valid one test parameter; while further testing another parameter of the first pulse;

the validation of the one parameter and then the other parameter of the first pulse being indicative of a valid first pulse; then developing an off signal in response to the validation of the first pulse and the receipt of an associated second pulse; and then measuring a relationship between the on signal and the off signal;

enabling the testing of one parameter of a second pulse; while further testing the second pulse for the validity thereof with respect to another parameter;

the validation of the first pulse and the validity of the second pulse with respect to the one parameter enabling a control pulse generator;

the validation of the second pulse with respect to the other parameter further enabling the generator;

the enabled generator being operated at the end of the predetermined time interval for causing the measured relationship to be converted into the measurement of another parameter as an indication of the receipt of a sequence of valid associated first and second pulses.

12. A method of testing echo pulses received from surfaces of an elongated material being advanced under test in response to the pulsing of a transducer aligned with the material in order to measure the material, which includes the steps of:

delaying for a predetermined time after the pulsing of the transducer the examination of echo pulses;

enabling facilities for testing the threshold minimum amplitude of the first pulse received from one of the surfaces of the material under test while establishing a time interval during which echo pulses received are tested;

testing the threshold minimum amplitude of a first echo pulse;

impressing a signal on a device to enable the counting of pulses corresponding to the receipt of a first echo pulse;

causing the device to begin counting;

determining whether after a preset delay time the first echo pulse has decayed below the minimum amplitude, a valid first echo having the threshold minimum amplitude for less than the preset delay time;

testing the threshold minimum amplitude of an associated second echo pulse for a qualifying value;

discontinuing the count upon the receipt of a qualifying associated second echo pulse during the time interval;

determining that the second echo pulse exceeds the qualifying value within a duration having a preset value; and testing the peak amplitude of the second echo pulse to determine if the peak amplitude is greater than a predetermined magnitude, a valid second pulse having a peak amplitude greater than the predetermined magnitude;

the validity of the first echo pulse and the second echo pulse causing the count to be accepted and stored as a valid measurement.

13. A method of determining the validity of each successive sequence of associated first and second echo pulses reflected from surfaces subjected to ultrasonic waves, a valid first pulse having a predetermined minimum amplitude for a duration no greater than a preset value and a valid second pulse having a predetermined minimum amplitude and a duration greater than a preset time and of generating a control pulse for valid sequences of associated echo pulses, which includes the steps of:

applying the first echo pulse and then the associated second echo pulse as inputs to a logic circuit;

testing the minimum amplitude level of the first echo pulses and then the second echo pulse compared to the validity level;

developing an on signal for a counter upon determining that the first echo pulse has the required level;

causing a first echo pulse having the predetermined minimum amplitude to generate a control pulse to delay the examination of the existence of the first echo pulse after the preset value;

determining whether a first echo pulse of the predetermined minimum amplitude is present after the preset value;

developing an off signal for the counter upon validating the first echo pulse and receiving the second echo pulse;

enabling a verification circuit for an associated second echo pulse subsequent to validating a first echo pulse;

causing the enabled second echo pulse verification circuit to generate a holdoff and a validation pulse during the receipt of a second echo pulse;

testing the peak amplitude of the second echo pulse; while determining the presence of the second echo pulse at the predetermined minimum amplitude following the holdoff pulse of the preset time;

enabling the device should the first pulse be valid and the second echo pulse have a duration greater than the preset time; and further enabling the device for generating the control pulse should the peak amplitude of the second pulse be validated.

14. An apparatus for measuring ultrasonically the thickness of successive sections of an elongated member in which an on signal and an off signal are developed in response to the receipt of first and second associated echo pulses of predetermined test characteristics from one surface and an opposite surface, respectively, of the member and in which relative motion is caused to occur betwen the successive sections of the elongated member and a source of ultrasonic pulses, which includes:

means for establishing a test period during which echo pulses are tested;

means for transmitting an ultrasonic pulse into the member and then receiving a first echo pulse reflected from the one surface of the member and then receiving an associated second echo pulse from an opposite surface of the member;

means for excluding extraneous low level signals;

means for testing the first echo pulse and then an associated second echo pulse for a qualifying predetermined minimum amplitude;

means actuated in response to receiving a qualifying first echo pulse for initiating the development of the on signal and the examination of a validating duration characteristic of the first echo pulse;

means responsive to the validation of the first echo pulse and the receipt of a qualifying associated second echo pulse for initiating the examination of validating test characteristics of a qualifying associated second echo pulse;

means for causing the development of the off signal with the time duration between the on signal and the off signal being related to the elapsed time between the receipt of the first echo pulse from the one surface and the receipt of the associated second echo pulse from the opposite surface;

means for measuring the elapsed time between the on signal and the off signal;

means for generating a pulse to control the disposition of the measured elapsed time;

means responsive to the first echo pulse being validated for enabling partially the means for generating a control pulse;

means responsive to validating the associated second echo pulse for completing the enabling of the pulse generation means to cause the generating means to generate the control pulse; and means responsive to the generation of a control pulse for converting the measured elapsed time into a signal the amplitude of which is proportional to the thickness of the elongated member.

15. The apparatus of claim 14, wherein the test characteristic for completing the validation of a qualifying first echo pulse is that the duration during which the predetermined minimum amplitude of the first echo pulse occurs is less than a preset time.

16. The apparatus of claim 15, wherein the test characteristics for completing the validation of the associated second echo pulse includes a peak amplitude and a duration in excess of preset values.

17. The apparatus of claim 14, wherein the means for transmitting of ultrasonic pulses includes a transducer immersed in a coupling medium and spaced from the elongated member and means for exciting the transducer to transmit the ultrasonic pulse.

18. The apparatus of claim 15, wherein:

a valid first pulse being one where the predetermined amplitude occurs only during a preset time;

the means for initiating the examination of the qualifying associated second echo pulse including the examination of peak amplitude and a duration characteristic of a qualifying associated second echo pulse;

a valid second echo pulse having at least a predetermined peak amplitude and the minimum amplitude occurring within a preset duration.

19. The apparatus of claim 18, wherein the means for transmitting of ultrasonic pulses includes a transducer immersed in a coupling medium and spaced from the elongated member and means for exciting the transducer to transmit the ultrasonic pulse.

20. The apparatus of claim 20, where the elongated member is a cable jacket and the measured elapsed time is converted into a signal proportional to the thickness of the cable jacket.

21. The apparatus of claim 20, wherein the transmitting of ultrasonic pulses includes the exciting of a transducer immersed in a coupling medium and spaced from the elongated member.

22. The apparatus of claim 21, wherein a pair of transducers are positioned in alignment with diametrically opposed points on the jacket of the cable, wherein the transducers are pulsed cyclically sequentially and which also includes:
   means processing the thickness measurements of the jacket at the diametrically opposed points for determining the eccentricity of the cable jacket.

23. An apparatus for discriminating among pulses received from a sensor to indicate the receipt of a sequence of valid associated pulses, which includes:
   means for permitting after a predetermined delay the testing of pulses within a predetermined time interval;
   means for enabling the testing of one parameter of a first pulse upon the receipt thereof;
   means developing an on signal upon receipt of a first pulse having a valid one test parameter;
   means for further testing another parameter of the first pulse;
   the validation of the one parameter and then the other parameter of the first pulse being indicative of a valid first pulse;
   means for developing an off signal in response to the validation of the first pulse and during the receipt of an associated second pulse;
   means for measuring a relationship between the on signal and the off signal;
   means for enabling the testing of one parameter of a second pulse; and
   means for further testing the second pulse for the validity thereof with respect to another parameter;
   the validation of the first pulse and the validity of the second pulse with respect to the one parameter enabling a control pulse generator;
   the validation of the second pulse with respect to the other parameter further enabling the generator;
   the enabled generator being operated at the end of the predetermined time interval for causing the measured relationship to be further processed as an indication of the receipt of a sequence of valid associated first and second pulses.

24. A logic circuit for validating a sequence of associated first and second pulses, which includes:
   comparator means for testing the amplitude characteristics of the pulses;
   means for testing the duration of a first pulse having a required amplitude characteristic;
   means for testing the duration of an associated second pulse, the testing of the duration of the second pulse initiating the comparator to test the peak amplitude of the second pulse;
   means for developing an on signal upon receipt of a first pulse having the required amplitude and an off signal upon validation of the first pulse and during the receipt of a second pulse, a predetermined relationship of the on signal and the off signal being related to a parameter to be measured;
   means for measuring the relationship between the on signal and the off signal;
   means for causing the measurement to be further processed;
   first logic means responsive to receipt of a first pulse having the required amplitude for initiating the developing means and the first pulse duration testing means;
   second logic means responsive to a valid first pulse, a valid first pulse having the required amplitude characteristic only within a preset duration, and a valid associated second pulse, a valid second pulse having a required amplitude characteristic occurring at least within a preset duration for enabling the causing means;
   third logic means responsive to the validation of a first pulse and to the receipt of a second pulse of required minimum amplitude for enabling the second logic means, for developing the off signal and for operating the second pulse peak amplitude verification means;
   the validation of the second pulse with respect to peak amplitude further enabling the causing means; and
   means beginning a test cycle for operating the causing means when the causing means is enabled at the end of the test cycle and for conditioning the circuit for another cycle of operation.

25. An apparatus for measuring ultrasonically the thickness of a cable jacket, which includes:
   means for cyclically transmitting ultrasonic pulses into engagement with the outwardly and the inwardly facing surfaces of the cable jacket;
   means for receiving a first echo pulse reflected from the outwardly facing surface and an associated second echo pulse from the inwardly facing surface;
   first comparator means for testing an amplitude characteristic of the first echo pulse and responsive to a valid first echo pulse for testing the an amplitude characteristic of the second echo pulse, a valid echo pulse having a predetermined minimum amplitude at threshold, and subsequently only occurring within a preset duration, a valid second echo pulse having a minimum amplitude at threshold, the minimum amplitude also occurring within a duration in excess of a preset time, and a peak amplitude greater than a predetermined value;
   logic means when operated for developing an on signal and responsive to being disabled for developing an off signal with the time duration between the on signal and the off signal being related to the elapsed time between the transmission of a pulse into the outwardly facing surface of the jacket and and receipt of a corresponding echo pulse at the outwardly facing surface after reflection from the inwardly facing surface;
   means for measuring the time between the on signal and the off signal;

a monostable device which when operated causes the time between the on signal and the off signal to be recorded;

means delayed a predetermined time for enabling the comparator means and for enabling the monostable device;

means for validating the duration of the first echo pulse;

means interposed between the first comparator means and the first echo pulse validating means and responsive to the receipt of a first echo pulse having the required minimum amplitude for operating the first echo pulse echo validating means and for causing the developing means to develop the on signal;

means for validating the duration of the second echo pulse;

second comparator means for testing the peak amplitude of the second echo pulse;

switching means rendered effective by the validation of the first echo pulse and enabled by the receipt of the second echo pulse for operating the second pulse validation means;

the means for validating the duration of the second echo pulse causing the second comparator means to be operated;

switching means rendered effective by the validation of the first echo pulse and the second echo pulse having at least the predetermined duration for further enabling the monostable device;

the validation of the peak amplitude of the second pulse still further enabling the monostable device to operate the monostable device and cause the count to be stored; and sequence control means for causing the transmitting means to operate and for conditioning the apparatus for each successive cycle of operation.

26. A logic circuit for discriminating among pulses to determine and record a measurement corresponding to a sequence of valid first and second pulses, which includes:

means for delaying the testing of pulses;

first comparator means for testing received pulses for minimum amplitude;

means connected to the first comparator means for testing a first pulse of a sequence for duration;

second comparator means for testing the second pulse of each sequence for a peak amplitude during a duration test thereof;

means connected to the first pulse duration testing means for testing a second pulse of a sequence for duration and for enabling the second comparator means;

first logic means for developing an on signal upon receipt of the first echo pulse of a sequence and then an off signal upon receipt of a second echo pulse with the time interval therebetween being indicative of a quantity to be measured;

means for measuring the time interval;

pulse generator means responsive to inputs indicative of a sequence of valid first and second pulses for causing the measured interval to be further processed;

second logic means responsive to the receipt of a first echo having the minimum amplitude for causing the first logic means to develop the on signal and to operate the first pulse duration test means;

third logic means connected to the first pulse duration test means and the second pulse duration test means and the second logic means for controlling the operation of the second pulse duration test means, and being responsive to a valid first pulse and the receipt of a second pulse spaced from the first for initiating the duration test of the second pulse while causing the first logic means to develop the off signal, the third logic means responsive to an invalid first pulse for inhibiting the operation of the second pulse duration test;

fourth logic means connected to the third logic means, the second comparator means and the means for testing the duration of the second echo pulse and responsive to the receipt of a sequence of valid first and second echo pulses for enabling the pulse generation means; and monostable means rendered effective after the delay for enabling the testing of the first and second pulses and responsive at the end of the delay for causing the pulse generator if enabled by receipt of a sequence of valid first and second pulses to generate a control pulse.

27. An electrical logic circuit for developing an on signal and an off signal with the measured time duration between the on signal and the off signal being related to the elapsed time between the receipt of a valid first echo pulse, defined as having at least a predetermined threshold value which does not occur beyond a predetermined time, reflected from a first surface, and the receipt of a valid second echo pulse, defined as having at least a predetermined threshold value which also occurs within a predetermined time and a predetermined peak amplitude being reflected from a second surface spaced from the first surface and for causing the measured time duration for valid first and second pulses to be retained, which includes:

comparator means for comparing the threshold values of amplitude of the first and second pulse and the peak amplitude of the second echo pulse;

a first echo pulse time duration validation circuit;

a second echo pulse time duration validation circuit;

means connected to the comparator means for enabling the comparator means to generate an output signal in response to a first echo pulse having the required threshold amplitude;

first logic means when operated by the simultaneous impression of like signals on the inputs thereof indicative of a first pulse echo of requisite threshold for developing an on signal and responsive to the receipt of a signal indicative of the receipt of the beginning of the second echo pulse for developing an off signal with the time duration between the on and off signals being related to the time elapsed between the receipt of the first echo pulse and the second echo pulse;

monostable means connected to the first and second pulse echo time duration validation circuits for causing the time interval to be retained;

bistable means normally in a first state connected to the first pulse validation circuit and the second pulse validation circuit when operated to a second state for operating the second pulse validation circuit;

second logic means interposed between the first pulse validation circuit and the bistable means and responsive to a valid first echo pulse for setting the bistable element to the second state;

the second pulse validation circuit being connected to the comparator means for causing the comparator means to test the peak amplitude of the second echo pulse during the predetermined duration;

third logic means connected to the first validation circuit and the monostable element and operated by the validation of the first echo pulse and the validation of the duration of the second pulse for enabling the monostable means; and bistable means normally in a first unoperated state and when operated by the validation of peak amplitude of the second echo pulse being switched to a second state thereby causing the monostable means to generate a pulse to cause the recording of the time interval.

28. An electrical logic circuit for developing an on signal and an off signal with the measured time duration between the on signal and the off signal being related to the elapsed time between the receipt of a valid first echo pulse defined as having at least a predetermined threshold value which does not occur beyond a predetermined time reflected from a first surface and the receipt of a valid second echo pulse defined as having at least a predetermined peak amplitude and a preset threshold value which also occurs within a preset time duration from a second surface spaced from the first surface and for causing the measured time duration for valid first and second pulses to be processed, which includes:

a first comparator for amplitude detection of pulses of either polarity having at least a predetermined level;

a second comparator for determining if the peak amplitude of a pulse is greater than a predetermined value;

the comparators having an input signal applied thereto in response at least to the receipt of the echo pulses;

means operated after a predetermined delay for enabling the comparators;

a first bistable element normally in a first state;

first echo pulse verification means connected to the first bistable element for determining the validity of the first pulse with respect to duration and that the end of the first echo pulse is spaced from the beginning of the second echo pulse;

first logic means responsive to like signals being impressed on the inputs thereof for developing the on signal and responsive to the disabling thereof for developing the off signal;

the first logic means for developing on and off signals being connected to the first bistable element;

means for enabling the first logic means after the delay;

second logic means interposed between the first comparator and the first bistable element and responsive to an echo pulse having the required threshold amplitude impressed upon the input of the first comparator for causing the first bistable element to assume a second state;

the setting of the first bistable element to a second state operating the enabled first logic means and causing the first echo pulse verification means to be operated;

third logic means connected to the output of the second logic means associated with the first comparator and connected to the first echo pulse verification means;

second echo pulse verification means for validating the associated second echo pulse with respect to duration;

means for causing the time interval to be processed;

means operated upon the inputs thereof being impreseed simultaneously with like signals caused by a valid first pulse and a second pulse of at least the predetermined duration and connected to the causing means for enabling the causing means;

a second bistable element connected to the developing means interposed between the third logic means and the second echo pulse verification means and when in a second state for causing the developing means to develop the off signal and for operating the second echo pulse verification means;

the second echo pulse verification means being effective during the predetermined time for enabling the second comparator to test the peak amplitude of the second echo pulse;

a third bistable element interposed between the second comparator and the causing means and responsive to being set to a second state for further enabling the initially enabled causing means; and the third bistable element being set to a second state by the second comparator receiving a second echo pulse having a peak amplitude greater than the preset value;

the causing means being operated by the comparator enabling means after a predetermined time greater than the combined durations of the first and second echo pulses plus the separation therebetween.

29. A circuit for measuring ultrasonically the thickness of a jacket of a cable being advanced along a predetermined path with a transducer being spaced from the cable and at least partially immersed in a coupling medium, which includes:

means initiating a cycle of operation for causing the transducer to emit ultrasonic waves into engagement with the outwardly facing surface of the cable jacket whereupon successive first echo pulses are reflected, portions of the ultrasonic waves being propagated through the jacket and upon engagement with the interface of the inwardly facing surface causing successive associated second echo pulses to be reflected;

a first comparator for determining if an amplitude of successive ones of the associated pairs of first and second echo pulses is at least a predetermined minimum level; ;

a second comparator for determining if the peak amplitude of the successive ones of the second echo pulses is at least a predetermined value;

a first monostable multivibrator when operated for generating a pulse having a predetermined time interval during which a valid sequence of first and second echo pulses may occur, the first multivibrator being connected to the first comparator;

a second monostable multivibrator interposed between the cycle initiation means and the first multivibrator for delaying the generation of the pulse having the predetermined time interval;

a third monostable multivibrator responsive to the validation of a sequence of associated first and second echo pulses for generating a control pulse;

a valid first pulse having the predetermined minimum amplitude which occurs only within a duration less than one preset time;

a valid second pulse having at least a predetermined peak amplitude and a duration in which the minimum amplitude also occurs being in excess of another preset time;

the generation of the pulse having the predetermined time interval enabling the first comparator;

a first logic element connected to the first comparator and operated by a signal impressed thereon by the first comparator in response to receiving a first echo pulse of at least the required minimum amplitude level;

a first echo pulse verification circuit connected to the output of the first logic element;

a second logic element connected to the first logic element for developing an on signal and an off signal with the time duration between the on signal and the off signal being related to the elapsed time between the receipt of a first echo from the outwardly facing surface of the cable jacket and the receipt of an associated second echo pulse from an opposite surface of the material;

means for measuring the time between the on signal and the off signal;

the second logic element being operated when the first logic element is operated for developing an on signal to control the measuring means to begin counting;

a third logic element having inputs connected to the first logic element and to the first echo pulse verification circuit;

the first echo pulse verification circuit generating a holdoff pulse of the one preset time and for then enabling the third logic element;

the third logic element caused to be operated when the first logic element is being operated subsequent to the holdoff pulse and for a predetermined time thereafter;

a fourth logic element having inputs connected to the first logic element and to the first echo pulse verification circuit;

a second echo pulse verification circuit connected to the fourth logic element;

a first bistable device switched in response to the third logic element being operated for discontinuing the operation of the circuit because of the extended duration of the first echo pulse, and switched responsive to the third logic element being in an unoperated state for conditioning the fourth logic element;

a fifth logic element interposed between the bistable means and the third monostable multivibrator and connected to the second echo pulse verification circuit;

the bistable device when switched responsive to the third logic element being unoperated conditioning the fifth logic element;

the fourth logic element responsive to the first logic element being operated for impressing a signal on the second verification circuit and on the developing means to cause the developing means to develop an off signal to discontinue the count, the count corresponding to the time between the pulses and related to the jacket thickness;

the impression of the signal on the input of the second verification circuit causing the generation of a holdoff pulse of the other preset time;

the second verification circuit being connected to the second comparator for impressing thereon a signal to enable the second comparator;

a second bistable device normally in a first state interposed between and connected to the second comparator and to the third monostable multivibrator;

the enabled second comparator operated by a second echo pulse of the required peak amplitude to cause the second bistable element to assume a second state;

the switching of the second bistable element to the second state causing a signal to be impressed on the third multivibrator to enable the third multivibrator a sixth logic element connected to the second verification circuit and to the first logic element;

the sixth logic element operated by the simultaneous impression of like signals from the second verification circuit and from the output of the first logic element to establish that the second pulse reaches the minimum amplitude during a time interval in excess of the other preset time;

the operation of the sixth logic element causing the enabled fifth logic element to be operated;

the operation of the fifth logic element further enabling the third multivibrator;

the trailing edge of the pulse having the predetermined time interval operating the enabled third monostable multivibrator to cause the third monostable multivibrator to generate the control pulse which causes the count to be processed to a measurement of thickness; and a pulse repetition sequencer for cyclically operating the initiating means and for resetting the elements of the circuit to condition the circuit for further cycles of operation.

30. Apparatus for emitting ultrasonic waves toward and into engagement with an outwardly facing surface of successive sections of a jacket of a cable being advanced along a predetermined path of travel whereupon a first echo pulse is reflected therefrom and then through the cable jacket and into engagement with the next successive acoustical interface at the inwardly facing surface of the jacket whereat a second echo pulse is reflected, which includes:

a transducer aligned with the path of travel of the cable and having at least the portion thereof facing the cable being immersed in a coupling medium;

a plurality of serially arranged silicon-controlled-rectifiers which when operated cause a short duration high voltage to be applied to the transducer to excite the transducer and cause the transducer to emit the ultrasonic waves;

means responsive to an input for operating the silicon-controlled-rectifiers;

means for applying an input to the operating means;

means for receiving and amplifying the returning echo pulses; and a diode interposed between the transducer and the silicon-controlled-rectifiers for preventing the amplification of spurious noise signals as generated by the silicon-controlled-rectifiers.

* * * * *